(12) United States Patent
Few et al.

(10) Patent No.: US 10,829,570 B2
(45) Date of Patent: Nov. 10, 2020

(54) AZIDE-MODIFIED POLYNORBORNENE AS POLYMERIC COUPLING AGENT

(71) Applicant: BRASKEM AMERICA, INC., Philadelphia, PA (US)

(72) Inventors: Chip Few, Pittsburgh, PA (US); Jonas Alves Fernandes, Pittsburgh, PA (US); Jon Scott Larson, Pittsburgh, PA (US)

(73) Assignee: BRASKEM AMERICA, INC., Philadelphia, PA (US)

( * ) Notice: Subject to any disclaimer, the term of this patent is extended or adjusted under 35 U.S.C. 154(b) by 153 days.

(21) Appl. No.: 15/953,247

(22) Filed: Apr. 13, 2018

(65) Prior Publication Data
US 2018/0298141 A1 Oct. 18, 2018

Related U.S. Application Data

(60) Provisional application No. 62/485,203, filed on Apr. 13, 2017, provisional application No. 62/509,998, filed on May 23, 2017.

(51) Int. Cl.
| | | |
|---|---|---|
| *C08F 8/30* | (2006.01) | |
| *C08F 32/08* | (2006.01) | |
| *C08F 32/02* | (2006.01) | |
| *C08G 61/08* | (2006.01) | |

(52) U.S. Cl.
CPC .............. *C08F 8/30* (2013.01); *C08F 32/02* (2013.01); *C08F 32/08* (2013.01); *C08G 61/08* (2013.01); *C08G 2261/11* (2013.01); *C08G 2261/143* (2013.01); *C08G 2261/148* (2013.01); *C08G 2261/1424* (2013.01); *C08G 2261/1452* (2013.01); *C08G 2261/228* (2013.01); *C08G 2261/3324* (2013.01); *C08G 2261/418* (2013.01); *C08G 2261/72* (2013.01); *C08G 2261/722* (2013.01)

(58) Field of Classification Search
CPC .................................. C08F 8/30; C08F 32/08
See application file for complete search history.

(56) References Cited

U.S. PATENT DOCUMENTS

| | | | | |
|---|---|---|---|---|
| 5,444,135 | A * | 8/1995 | Cheradame | C08F 2/38 526/219.2 |
| 5,882,799 | A | 3/1999 | Roseboom et al. | |
| 6,291,618 | B1 | 9/2001 | Silvis et al. | |
| 6,294,616 | B1 * | 9/2001 | Rhodes | C08F 232/08 525/332.1 |
| 6,492,443 | B1 * | 12/2002 | Kodemura | C08G 61/04 524/114 |
| 8,039,544 | B2 | 10/2011 | Wei et al. | |
| 2002/0091199 | A1 | 7/2002 | Babb et al. | |
| 2002/0151609 | A1 | 10/2002 | Chaudhary et al. | |
| 2003/0055179 | A1 | 3/2003 | Ota et al. | |
| 2003/0130446 | A1 * | 7/2003 | Zhang | C08F 210/02 526/127 |
| 2006/0210816 | A1 | 9/2006 | Finley | |
| 2014/0206251 | A1 | 7/2014 | Stokes | |
| 2015/0038647 | A1 * | 2/2015 | Boisson | C08F 8/34 260/665 G |
| 2016/0311970 | A1 * | 10/2016 | Claverie | C08G 59/4215 |
| 2016/0362509 | A1 * | 12/2016 | Fernandes | C08G 81/021 |

OTHER PUBLICATIONS

Sankar et al., "Functionalization of terminal carbon atoms of hydroxyl terminated polybutadiene of polyazido nitrogen rich molecules," Bull. Mater. Sci. 34: 745-754 (2011).

* cited by examiner

*Primary Examiner* — Mark S Kaucher
(74) *Attorney, Agent, or Firm* — Jeffrey N. Townes; Conzen O'Connor

(57) ABSTRACT

This invention relates to a process for forming a long-chain branched polymer and a long-chain branched polymer resulting from the process. The process comprises reacting (a) a polyolefin base polymer with (b) a coupling agent comprising a polymeric coupling agent, optionally blended with a molecular coupling agent, the polymeric coupling agent being a modified polyolefin having a reactive coupling group at one or more terminal ends of the modified polyolefin chain, to couple the polyolefin base polymer (a) with the coupling agent (b) to form a long-chain branched polymer having a long-chain branching and/or higher surface energy relative to the polyolefin base polymer.

33 Claims, 11 Drawing Sheets

AZIDE-MODIFIED POLYNORBORNENE AS POLYMERIC COUPLING AGENT

PRIORITY CLAIM

This invention claims priority under 35 U.S.C. § 119(e) to U.S. Provisional Application No. 62/485,203, filed Apr. 13, 2017, and U.S. Provisional Application No. 62/509,998, filed May 23, 2017, both of which are herein incorporated by reference in their entirety.

FIELD OF THE INVENTION

This invention relates to a novel polymeric coupling agent and methods of making and using thereof in forming a long-chain branched polymer.

BACKGROUND OF THE INVENTION

Polypropylene compositions have gained wide commercial acceptance and usage in numerous applications because of the relatively low cost of the polymers and the desirable properties they exhibit. Commercially available isotactic polypropylenes are polymers that have a highly linear structure, have relatively low melt strength, and exhibit poor strain hardening behavior in the molten state. While these isotactic polypropylenes are relatively easy to produce, they have very limited applications in processes such as thermoforming, foaming, blow molding, film molding, extrusion coating, because of their poor extensional performance, poor film toughness properties, and low melt strength.

Polymers containing long-chain branches, on the other hand, have great value in processing techniques that demand high melt strength.

However, there are substantial difficulties in creating long-chain branched polyolefin, particularly polypropylene. Known routes to produce polypropylene in commercial scale, such as Ziegler-Natta and Metallocene catalysis, usually produce highly linear and highly stereospecific polymers. Polymers with a branched or long-chain branched structure have been reported using Metallocene catalysts, although there are significant limitations in the polymerization process and catalyst performance that impose a challenge for production in commercial scale.

In another example, very small amounts of long-chain branches are known to be produced and controlled during the polymerization of high density polyethylene (HDPE) using chromium catalyst. The amount of branches or long-chain branches, along with molecular weight (MW) and molecular weight distribution (MWD) are factors to determine the melt elasticity of the polyethylene (PE), which largely defines its commercial processing characteristics.

There are also processes to introduce long-chain branches into polyolefins via post polymerization. For instance, a long-chain branched polypropylene can be prepared through a coupling reaction of polypropylene and sulfonyl azides. However, there are disadvantages using sulfonyl azide chemistries. For example, some sulfonyl azides can be highly reactive, making reaction control difficult due to the relative lower temperatures (below 140° C.) in which the nitrene radical is formed, which can consequently lead to an uneven distribution of linkages in the polypropylene sample. Furthermore, highly reactive sulfonyl azides compounds may increase the risk for explosion and the generation of toxic by-products.

There thus remains a need in the art to develop an improved process to prepare polyolefins having long-chain branches that can provide high melt strength.

SUMMARY OF THE INVENTION

One aspect of the invention relates to a polymeric coupling agent comprising a polymer prepared from at least one olefin monomer or derivative thereof containing 2 to 20 carbon atoms. The polymeric coupling agent also comprises one or more reactive coupling groups covalently bonded to one or more terminal ends of the polymer chain and/or one or more repeating units of the polymer, optionally via one or more linking moieties.

Another aspect of the invention relates to a process for preparing a polymeric coupling agent, comprising; polymerizing a diene monomer, optionally with one or more comonomers, by solution-free radical polymerization, in the presence of an initiator that provides an aryl functional fragment and a solvent that does not act as a chain transfer agent, to form an aryl-terminated polydiene. The aryl-terminated polydiene is then reacted with a sulfonating agent to form a sulfonyl aryl-terminated polydiene, which is then reacted with an alkali metal azide to form an azide-modified polymeric coupling agent.

Alternatively, another aspect of the invention relates to a process for preparing a polymeric coupling agent, comprising; polymerizing a diene monomer, optionally with one or more comonomers, by solution-free radical polymerization, in the presence of an initiator that provides a sulfonyl aryl functional fragment and a solvent that does not act as a chain transfer agent, to form a sulfonyl aryl-terminated polydiene. The sulfonyl aryl-terminated polydiene is then reacted with an alkali metal azide to form an azide-modified polymeric coupling agent.

Another aspect of the invention relates to a process for preparing a polymeric coupling agent, comprising; reacting a polymer terminated with a carboxylic group with the carboxylic-reactive group X of a functionalized linking moiety having the structure of X-L-Q, to attach the linking moiety Q-L to the polymer. L is a linking moiety comprising one or more of —O—, —C(O)—, aryl, alkyl,

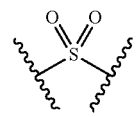

and combinations thereof; Q is an azide-reactive group selected from the group consisting of halogen, —OH, —O—, alkoxide, —OC(O)R$_1$, fluoroalkoxide, and fluoroaryl, wherein R$_1$ is alkyl or aryl; and X is a carboxylic-reactive group containing a heteroatom selected from the group consisting of nitrogen, oxygen, and sulfur. The resulting linking moiety-attached polymer is reacted with an alkali metal azide to form an azide-modified polymeric coupling agent.

Another aspect of the invention relates to a process for forming a long-chain branched polymer, comprising: reacting (a) a polyolefin base polymer with (b) a polymeric coupling agent to form a long-chain branched polymer. The polymeric coupling agent comprises a polymer prepared from at least one olefin monomer or derivative thereof containing 2 to 20 carbon atoms, and one or more reactive coupling groups covalently bonded to one or more terminal ends of the polymer chain and/or one or more repeating units of the polymer, optionally via one or more linking moieties.

Additional aspects, advantages and features of the invention are set forth in this specification, and in part will become apparent to those skilled in the art on examination of the following, or may be learned by practice of the invention. The inventions disclosed in this application are not limited to any particular set of or combination of aspects, advantages and features. It is contemplated that various combinations of the stated aspects, advantages and features make up the inventions disclosed in this application.

DETAILED DESCRIPTION OF THE INVENTION

Figure 1:
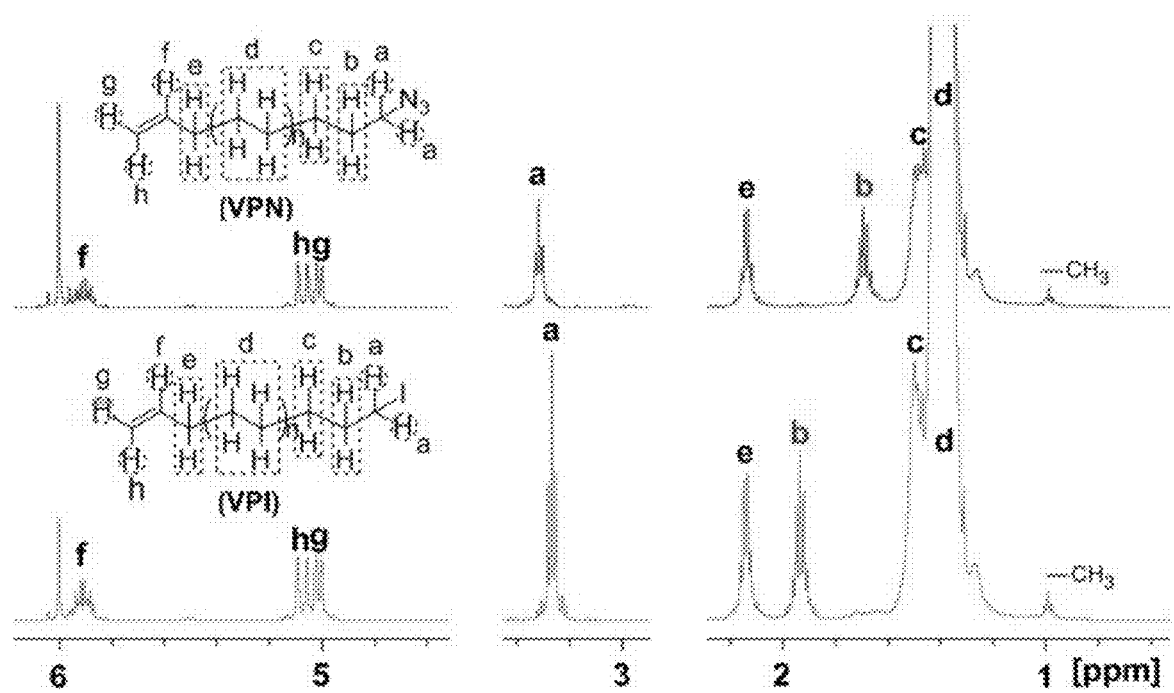
FIG. 1 shows the $^1$H NMR spectra of VPN and VPI.

This invention relates to an improved process to prepare polyolefins having long-chain branches. The long-chain branched polymers not only contain an increased degree of long-chain branching and different types of branching in the polymer, but, at the same time, provide improved performance in the handling process and improved attributes in the final polymer products. This is enabled by the use of a polymeric coupling agent. The polymeric coupling agent is a polymer prepared from at least one olefin monomer or derivative thereof containing 2 to 20 carbon atoms, and contains one or more reactive coupling groups covalently bonded to one or more terminal ends of the polymer chain and/or one or more repeating units of the polymer, optionally via one or more linking moieties. The polymeric nature of the polymeric coupling agent allows it to be stable to shock without the need for utilization of a phlegmatizing agent, which can lead to degradation compounds that complicate the food contact applications. The nonpolar nature of the backbone of the polymeric coupling agent makes it more readily dispersed in a molten polyolefin under industrial melt processing conditions. The long chain branching is imparted into the polyolefin by coupling of the polyolefin polymer chains via chemical reaction with functional groups on the multifunctional polymeric coupling agent. For instance, when the polymeric coupling agent is azide-functionalized polyolefin (e.g., polynorbornene), the long chain branches is imparted into the polyolefin polymer under a nitrene insertion mechanism.

Accordingly, one aspect of the invention relates to a polymeric coupling agent comprising a polymer prepared from at least one olefin monomer or derivative thereof containing 2 to 20 carbon atoms. The polymeric coupling agent also comprises one or more reactive coupling groups covalently bonded to one or more terminal ends of the polymer chain and/or one or more repeating units of the polymer, optionally via one or more linking moieties.

Another aspect of the invention relates to a process for forming a long-chain branched polymer, comprising: reacting (a) a polyolefin base polymer with (b) a polymeric coupling agent to form a long-chain branched polymer. The polymeric coupling agent comprises a polymer prepared from at least one olefin monomer or derivative thereof containing 2 to 20 carbon atoms, and one or more reactive coupling groups covalently bonded to one or more terminal ends of the polymer chain and/or one or more repeating units of the polymer, optionally via one or more linking moieties.

Another aspect of the present invention relates to a process for forming a long-chain branched polymer. The process comprises reacting (a) a polyolefin base polymer with (b) a coupling agent comprising a polymeric coupling agent being a modified polyolefin having a reactive coupling group at one or more terminal ends of the modified polyolefin chain, to couple the polyolefin base polymer (a) with the coupling agent (b) to form a long-chain branched polymer.

The coupling agent can further comprise a molecular coupling agent blended with the polymeric coupling agent.

Accordingly, another aspect of the present invention relates to a process for forming a long-chain branched polymer. The process comprises reacting (a) a polyolefin base polymer with (b) a coupling agent blend comprising a polymeric coupling agent blended with a molecular coupling agent, the polymeric coupling agent being a modified polyolefin having a reactive coupling group at one or more terminal ends of the modified polyolefin chain, to couple the polyolefin base polymer (a) with the coupling agent blend to form a long-chain branched polymer.

Another aspect of the invention relates to a process for forming a polymer. The process comprises reacting (a) a polyolefin base polymer with (b) a coupling agent comprising a polymeric coupling agent, optionally blended with a molecular coupling agent, the polymeric coupling agent being a modified polyolefin having a reactive coupling group at one or more terminal ends of the modified polyolefin chain and a non-reactive functional group at one or more terminal ends of the modified polyolefin chain, to couple the polyolefin base polymer (a) with the coupling agent (b) to form a polymer that has a higher surface energy relative to the polyolefin base polymer and is compatible with inorganic materials.

Polyolefin Base Polymer (a)

The coupling reaction can be used to introduce long-chain branches into any base polymer, polyolefin (a). Suitable polyolefin base polymers include polymers having a number average molecular weight of greater than 5,000 g/mol, greater than 10,000 g/mol, greater than 20,000 g/mol, greater than 30,000 g/mol, greater than 40,000 g/mol, or greater than 50,000 g/mol. Exemplary polyolefin base polymers include those prepared from linear or branched $\alpha$-olefins having 2 to 20 carbon atoms, 2 to 16 carbon atoms, or 2 to 12 carbon atoms, including but not limited to ethylene, propylene, 1-butene, 2-butene, 1-pentene, 3-methyl-1-butene, 1-hexene, 4-methyl-1-pentene, 3-methyl-1-pentene, 4,6-dimethyl-1-heptene, 1-octene, 1-decene, 1-undecene, 1-dodecene, 1-tetradecene, 1-hexadecene, 1-octadecene, 1-eicocene, and combinations thereof. These olefins may each contain a heteroatom such as an oxygen, nitrogen, or silicon atom.

The term "polyolefin" generally embraces a homopolymer prepared from a single type of olefin monomer as well as a copolymer prepared from two or more olefin monomers. A specific polyolefin referred to herein shall mean polymers comprising greater than 50% by weight of units derived from that specific olefin monomer, including homopolymers of that specific olefin or copolymers containing units derived from that specific olefin monomer and one or more other types of olefin comonomers. For instance, polypropylene shall mean polymers comprising greater than 50 wt % of units derived from propylene monomer, including polypropylene homopolymers or copolymers containing units derived from propylene monomer and one or more other types of olefin comonomers. The polyolefin used herein can be a copolymer wherein the comonomer(s) is/are randomly distributed along the polymer chain, a periodic copolymer, an alternating copolymer, or a block copolymer comprising two or more homopolymer blocks linked by covalent bonds.

Typical polyolefin base polymers include polyethylene, polypropylene, a copolymer of polyethylene and polypropylene, and a polymer blend containing polyethylene, polypropylene, and/or a copolymer of polyethylene and polypropylene. For example, the polyolefin base polymer (a) can be polypropylene. The polyolefin base polymer (a) can also be polyethylene.

The polyolefin base polymer (a) can also be an impact copolymer, i.e., a heterophasic polyolefin copolymer where one polyolefin is the continuous phase and an elastomeric phase is uniformly dispersed therein. This would include, for instance, a heterophasic polypropylene copolymer where polypropylene is the continuous phase and an elastomeric phase is uniformly distributed therein. The impact copolymer results from an in-reactor process rather than physical blending. A polypropylene impact copolymer may contain ethylene comonomer at the amount of at least 5 wt %, or at least 10 wt %; and up to 40 wt %, up to 35 wt %, up to 25 wt %, up to 20 wt %, or up to 15 wt %. Examples of some suitable impact polypropylene copolymers may be found in U.S. Pat. No. 6,593,005, which is incorporated herein by reference in its entirety.

The polyolefin base polymer (a) can also be a polymer blend containing ethylene propylene rubber (EPR). The term "blend" or "polymer blend" generally refers to a mixture of two or more polymers. Such a blend may or may not be miscible, and may or may not be phase separated. A polymer blend may or may not contain one or more domain configurations, as determined from transmission electron spectroscopy, light scattering, x-ray scattering, or other methods known in the art.

The Coupling Agent (b)

Polymeric Coupling Agent

A coupling reaction refers to a reaction of a polymer with a suitable coupling agent. The coupling agent used herein comprises a modified polyolefin containing a reactive coupling group at one or more terminal ends of the linear or branched chain, hereby referred to as "polymeric coupling agent." The amount of the polymeric coupling agent used in the coupling reaction depends on the degree of long-chain branches and the melt strength desired in the resulting long-chain branched polymer or the amount required to disrupt the surface energy of the final polymer product. For instance, the amount of the polymeric coupling agent can be less than 0.01 wt %, less than 0.05 wt %, less than 0.1 wt %, less than 0.5 wt %, less than 1 wt %, less than 2 wt %, less than 3 wt %, or less than 6 wt %.

Any polyolefin may be used to prepare the modified polyolefin of the polymeric coupling agent. Suitable modified polyolefins include polymers having a number average molecular weight of less than 20,000 g/mol, less than 15,000 g/mol, or less than 10,000 g/mol, e.g., polyolefins prepared from linear or branched olefins having 2 to 20 carbon atoms, 2 to 16 carbon atoms, or 2 to 12 carbon atoms, including but not limited to ethylene; propylene; 1-butene; 2-butene; 1,3-butadiene; 1-pentene; 1,3-pentadiene, 1,4-pentadiene; 3-methyl-1-butene; 3-methyl-1,4-pentadiene; 3,3-dimethyl-1,4-pentadiene; 1-hexene; 1,3-hexadiene; 1,4-hexadiene; 1,5-hexadiene; 4-methyl-1-pentene; 3-methyl-1-pentene; 3-methyl-1,5-hexadiene; 3,4-dimethyl-1,5-hexadiene; 4,6-dimethyl-1-heptene; 1,3-heptadiene; 1,4-heptadiene; 1,5-heptadiene; 1,6-heptadiene; 1-octene; 1,3-octadiene; 1,4-octadiene; 1,5-octadiene; 1,6-octadiene; 1,7-octadiene; 1-decene; 1-undecene; 1-dodecene; 1-tetradecene; 1-hexadecene; 1-octadecene; 1-eicocene; and combinations thereof. The polyolefin for preparing the polymeric coupling agent may be a homopolymer synthesized from a single olefin, or a copolymer synthesized from two or more olefins. For instance, the polyolefin for preparing the polymeric coupling agent may be polyethylene; polypropylene; copolymers of ethylene and propylene; or terpolymers of ethylene and propylene, and any one of butene, polybutene, polyisobutylene, polybutadiene, and polymethylpentene.

The polymeric coupling agent can have more than one reactive coupling groups. The reactive coupling group can be the same or different at each terminal end of the modified polyolefin chain.

The polymeric coupling agent may be prepared by any method known to one skilled in the art. For instance, the polymeric coupling agent vinyl-polyethylene-$N_3$ (VPN) used in Examples 1-9 can be prepared by reacting vinyl-polyethylene-I (VPI) with sodium azide. More descriptions relating to methods for preparation of telechelic or di-end-functional polyethylene may be found in WO 2013/135314; EP 1666507B1; Franssen et al., "Synthesis of functional 'polyolefins': state of the art and remaining challenges," *Chem. Soc. Rev.* 42, 5809-32 (2013); Yanjarappa et al., "Recent developments in the synthesis of functional poly (olefin)s," *Prog. Polym. Sci.* 27: 1347-98 (2002); and Jayaraman et al., "Epoxy and Hydroxy Functional Polyolefin Macromonomers," *J. Polym. Sci: Part A: Polym. Chem.* 34: 1543-52 (1996); all of which are hereby incorporated by reference in their entirety.

The reactive coupling group is capable of insertion reactions into C—H bonds of polymers. The C—H insertion reactions and the reactive coupling groups capable of such reactions are known to one skilled in the art. For instance, the reactive coupling group can be a diazo compound that generates carbene, which is capable of insertion reactions. As another example, the reactive coupling group can contain an azide bond. The cleavage of the azide bond generates nitrenes (i.e., a nitrogen containing a sextet of electrons), which is capable of insertion reactions. A further description of nitrene formations can be found in Abramovitch et al., "Thermal decomposition of o- and p-benzenedisulfonyl azides in benzene, cyclohexane, cyclohexene, and tetracyclone," *J. Org. Chem.* 40(7): 883-889 (1975), which is incorporated herein by reference in its entirety.

The reactive coupling group may also be capable of generating free radicals that undergo free radical reactions via a radical mechanism to couple coupling agent (b) with the base polymer, polyolefin (a). Alternatively, the polymeric coupling agent self-couples to form a self-coupled coupling agent and then couples with the base polymer. As one skilled in the art will understand, the overall reaction can be a combination of these reactions.

The reactive coupling group residing at one or more terminal ends of the modified polyolefin chain can be a same group or a different group. In one example, the reactive coupling group residing at one or more terminal ends of the modified polyolefin chain can be an azide group. For instance, when the modified polyolefin chain contains one reactive coupling group at one terminal end, the reactive coupling group can be an azide group (e.g., azide, an alkyl azide, an aryl sulfonyl azide, a phosphoryl azide, etc.). The modified polyolefin chain can also have reactive coupling groups at two or more terminal ends, or at all terminal ends, and the reactive coupling groups at these terminal ends can each be an azide group. Alternatively, the reactive coupling group at one terminal end of the modified polyolefin chain is an azide group, and the other terminal ends can contain one or more different reactive coupling groups (e.g., the reactive coupling group at one terminal end is azide, and the other terminal ends contain a reactive coupling group different than azide, such as an aryl sulfonyl azide, an alkyl azide, and/or a phosphoryl azide) or non-reactive functional groups. Non-reactive functional groups, for the purpose of this invention, are non-reactive with the base polymer, polyolefin (a), or with the polymeric coupling agent itself, but can be reactive to other groups or materials, such as inorganic materials.

Accordingly, suitable terminal groups of the modified polyolefin chain for the polymeric coupling agent include reactive coupling groups and/or non-reactive functional groups. Exemplary reactive coupling group or non-reactive functional groups include, but are not limited to, peroxides, alkyl boranes, halogens, thiols, amines, amides, aldehydes, alcohols, carboxylic acids, esters, diazo, isocyanates, silanes, phosphorous-containing groups, dithioesters, dithiocarbamates, dithiocarbonates, trithiocarbonates, alkoxyamines, aryl sulfonyl groups (such as aryl sulfonyl halides or aryl sulfonyl azides), phosphoryl azides, vinyls (such as vinyl, alkyl vinyls, vinylidenes, or aryl vinyls), dienes, dyes, porphyrins, alkyl azides, or derivatives thereof. For instance, the terminal group of the polymeric coupling agent can be an alkyl vinyl group.

In certain embodiments, the polymeric coupling agent has the structure of Formula I:

R is a peroxide, alkyl borane, halogen, thiol, amine, amide, aldehyde, alcohol, carboxylic acid, ester, isocyanate, silane, phosphorous-containing group, dithioester, dithiocarbamate, dithiocarbonate, trithiocarbonate, alkoxyamine, aryl sulfonyl halide, aryl sulfonyl azide, phosphoryl azides, vinyl (e.g., vinyl, an alkyl vinyl, vinylidene, or aryl vinyl), diene, porphyrin, dye, alkyl azide, or a derivative thereof.

$(X)_n$ is a polyolefin radical. X is a monomeric olefin unit that is linear or branched, saturated or unsaturated, and contains 2 to 10 carbon atoms. If branched, the branches may contain cyclic saturated, cyclic unsaturated, aromatic, saturated linear, or unsaturated linear hydrocarbyl group(s); the branches may or may not contain heteroatoms such as fluorine, chlorine, bromine, iodine, oxygen, sulfur, selenium, nitrogen, phosphorous, silicon, and boron. The integer n is at least 2, at least 5, or at least 10. For instance, n is 2 to 1000, 2 to 500, 5 to 500, 10 to 500, 10 to 200, 10 to 100, or 10 to 50.

R' is methylene, aryl, aryl sulfonate, oxy aryl sulfonate, acrylate, aryl acyl, alkyl acyl, epoxy, ester, amine, amide, diazo, or combinations thereof.

In certain embodiments, the polymeric coupling agent comprises a polymer prepared from at least one olefin monomer or derivative thereof, as defined supra, containing 2 to 20 carbon atoms. The polymeric coupling agent also comprises one or more reactive coupling groups covalently bonded to one or more terminal ends of the polymer chain and/or one or more repeating units of the polymer.

The reactive coupling groups can be covalently bonded to one or more terminal ends of the polymer chain. Alternatively, the reactive coupling groups can be covalently bonded to one or more repeating units of the polymer as pendent groups.

Suitable reactive coupling groups include, but are not limited to, epoxides, peroxides, alkyl boranes, halides, thiols, amines, amides, aldehydes, —OH, —COOH, esters, diazo, isocyanates, silanes, phosphorous-containing groups, dithioesters, dithiocarbamates, dithiocarbonates, trithiocarbonates, alkoxyamines, formyl azides, aryl sulfonyl groups (such as aryl sulfonyl halides or aryl sulfonyl azides), phosphoryl azides, vinyls (such as vinyl, alkyl vinyls, vinylidenes, or aryl vinyls), dienes, dyes, porphyrins, alkyl azides, aryl azide, or combinations or derivatives thereof. Exemplary reactive coupling group is selected from the group consisting of an amine, —C═C—, epoxide, —OH, —COOH, halide, sulfonyl azide, aryl azide, phosphoryl azide, acyl azide, formyl azides, alkyl azides, and combinations thereof. For instance, the reactive coupling group is a sulfonyl azide.

The reactive coupling groups can be covalently bonded to one or more terminal ends of the polymer chain and/or one or more repeating units of the polymer via one or more linking moieties. Suitable linking moieties are —O—, aryl, alkyl, acyl, sulfonyl, sulfonate ester, sulfonamide, phosphate ester, carboxylate ester, amine, amide, and combinations thereof.

In one embodiment, the reactive coupling group is a sulfonyl azide, which is covalently bonded to one or more terminal ends of the polymer chain and/or one or more repeating units of the polymer via the linking moiety, —C$_6$H$_4$—.

The olefin monomer or derivative thereof can be a cyclic olefin monomer or a bridged, cyclic olefin monomer. For instance, cyclic olefin monomers or bridged, cyclic olefin monomers containing 5 to 20 carbon atoms, or 7 to 10 carbon atoms.

The cyclic olefin monomer or bridged, cyclic olefin monomer can be a norbornene-based monomer, represented by the following formula:

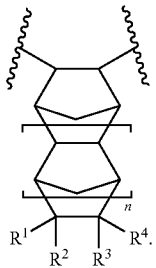

Accordingly, the polymeric coupling agent prepared from one or more norbornene-based monomers comprises one or more of the following repeating units of formula (I):

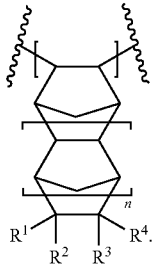

(I)

In formula (I), $R^1$, $R^2$, $R^3$, and $R^4$ are each independently selected from the group consisting of hydrogen; halogen; —OR$^5$; —C(O)OR$^5$; —OC(O)R$^5$; —NR$^5$R$^6$; —ONR$^5$R$^6$; —N(R$^5$)OR$^6$; —SR$^5$; —C(S)SR$^5$; —SC(S)R$^5$; —SC(S)NR$^5$R$^6$; —SC(O)SR$^5$; —SC(S)SR$^5$; —OSiR$^5$R$^6$R$^7$; —C≡C—R$^5$; epoxide; peroxide; alkyl borane; isocyanate; silanes; a hydrocarbyl or halohydrocarbyl group selected from the group consisting of linear or branched C$_1$-C$_{16}$ alkyl, perfluoroalkyl, C$_3$-C$_{12}$ cycloalkyl, C$_6$-C$_{12}$bicycloalkyl, C$_7$-C$_{14}$ tricycloalkyl, aryl, arylalkyl, perfluoroaryl, and perfluoroarylalkyl; —NH—Y$_1$—R$^8$—Y$_2$—N$_3$; and —X-aryl-SO$_2$N$_3$.

Y$_1$ and Y$_2$ are each independently absent,

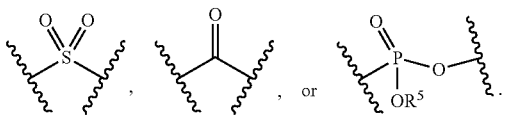

X is selected from the group consisting of: alkyl, aryl, ether, —NH—, NHSO$_2$—, —O—, —CO, —C(O)O, —OC (O), —OC(O)O—, —S, —(CR$^5$R$^6$)$_a$—, —O(CR$^5$R$^6$)$_a$—, —(CR$^5$R$^6$)$_a$O—, —(CR$^5$R$^6$)$_a$O(SiR$^5$R$^6$)$_a$—, —(CR$^5$R$^6$)$_a$O(CR$^5$R$^6$)$_a$—, —C(O)(CR$^5$R$^6$)$_a$—, —(SiR$^5$R$^6$)$_a$O (SiR$^5$R$^6$)$_a$—, —(CR$^5$R$^6$)$_a$C(O)—, —C(O)O(CR$^5$R$^6$)$_a$—, —(CR$^5$R$^6$)$_a$C(O)O—, —OC(O)(CR$^5$R$^6$)$_a$—, —(CR$^5$R$^6$)$_a$OC(O)—, —(CR$^5$R$^6$)$_a$OC(O)—, —(CR$^5$R$^6$)$_a$OC(O)O (CR$^5$R$^6$)$_a$—, —OC(O)O(CR$^5$R$^6$)$_a$—, —S(CR$^5$R$^6$)$_a$—, —(CR$^5$R$^6$)$_a$S—, —(SiR$^5$R$^6$)$_a$—, —O(SiR$^5$R$^6$)$_a$—, and —(SiR$^5$R$^6$)$_a$O—.

$R^5$, $R^6$, and $R^7$ are each independently hydrogen, linear or branched C$_1$-C$_{12}$ alkyl, or aryl. $R^8$ is absent, aryl, alkyl, or diarylether.

The integer a ranges from 0 to 12.

The integer n is 0, 1, or 2. Typically, n is 0.

Suitable norbornene-based monomers for preparation of the polymeric coupling agents also include those described in U.S. Pat. Nos. 5,344,900; 5,312,956; 5,569,730; and 9,261,782, all of which are hereby incorporated by reference in their entirety.

Typical norbornene-based repeating units for the polymeric coupling agents are

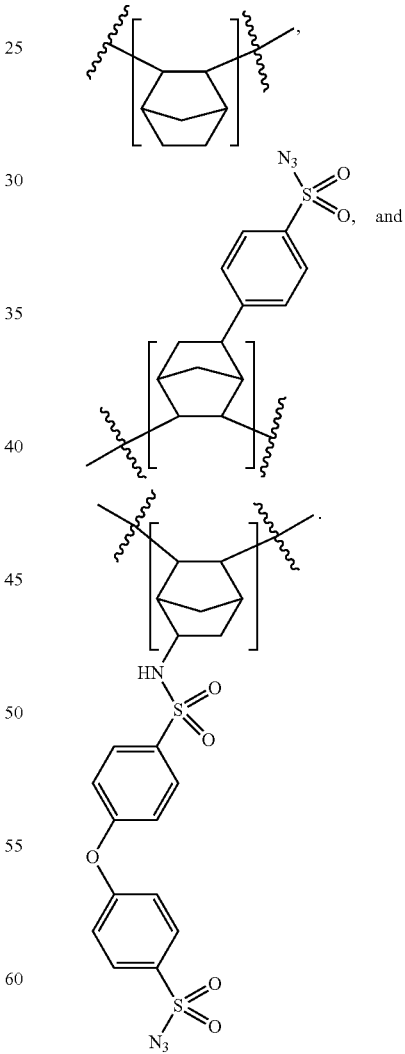

Exemplary polymeric coupling agents include those containing one or more repeating units of formula (I), in which at least one of $R^1$, $R^2$, $R^3$, and $R^4$ is —NH—Y$_1$—R$^7$—Y$_2$—

$N_3$ or —X-aryl-$SO_2N_3$. In these embodiments, the reactive coupling group, e.g., azide or sulfonyl azide, is covalently bonded, via one or more linking moieties, to one or more repeating units of the polymer as pendent groups.

The polymeric coupling agent can be a copolymer prepared based on two or more different norbornene-based monomers. For instance, the polymeric coupling agent comprises two or more different repeating units of formula (I). In one embodiment, at least one of $R^1$, $R^2$, $R^3$, and $R^4$ in one of the repeating units of formula (I) is —NH—$Y_1$—$R^7$—$Y_2$—$N_3$ or —X-aryl-$SO_2N_3$.

The polymeric coupling agent can also be a copolymer prepared from the olefin monomer and one or more olefin comonomers containing 3 to 20 carbon atoms. For instance, the copolymer can be prepared from two or more different olefin monomers or derivatives thereof, as defined supra. Suitable olefin monomers are selected from the group consisting of ethylene; propylene; 1-butene; 2-butene; 1,3-butadiene; 1-pentene; 1,3-pentadiene; 1,4-pentadiene; 3-methyl-1-butene; 3-methyl-1,4-pentadiene; 3,3-dimethyl-1,4-pentadiene; 1-hexene; 1,3-hexadiene; 1,4-hexadiene; 1,5-hexadiene; 4-methyl-1-pentene; 3-methyl-1-pentene; 3-methyl-1,5-hexadiene; 3,4-dimethyl-1,5-hexadiene; 4,6-dimethyl-1-heptene; 1,3-heptadiene; 1,4-heptadiene; 1,5-heptadiene; 1,6-heptadiene; 1-octene; 1,3-octadiene; 1,4-octadiene; 1,5-octadiene; 1,6-octadiene; 1,7-octadiene; 1-decene; 1-undecene; 1-dodecene; 1-tetradecene; 1-hexadecene; 1-octadecene; 1-eicocene; and combinations thereof.

Accordingly, exemplary polymeric coupling agents include those copolymers containing two or more of the following repeating units:

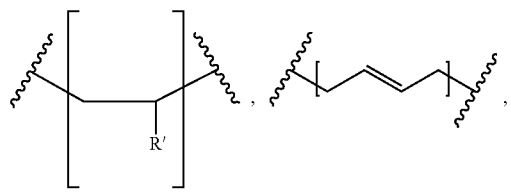,

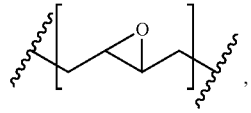,

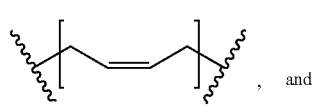, and

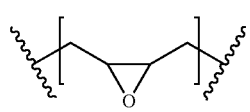.

In the above formulas, $R^1$ is H, alkyl, vinyl, aryl, —C(O)R″, —CN; and R″ is H, —OH, or alkoxy, $NH_2$. For instance, R' is H, vinyl, CN, or phenyl.

The polymeric coupling agent can also be a copolymer with one olefin comonomer being a norbornene-based monomer.

For instance, exemplary polymeric coupling agents include those copolymers comprising two or more of the following repeating units:

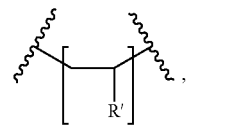,

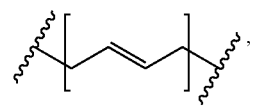,

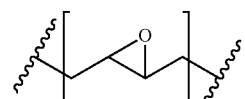,

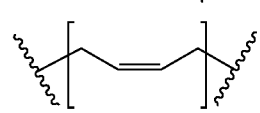,

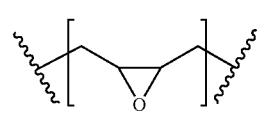, and 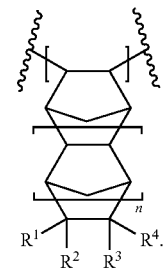.

The variables R', $R^1$, $R^2$, $R^3$, and $R^4$ for the above formulas and their alternative embodiments are the same as those discussed supra.

Exemplary polymeric coupling agents have the following structures:

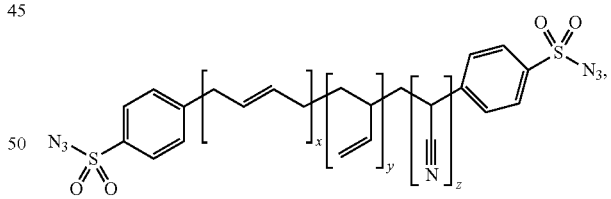

wherein x+y+z ranges from 1 to 1,000;

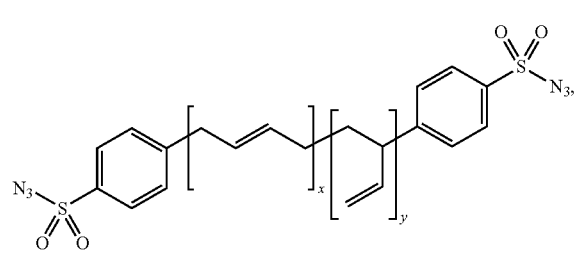

wherein x+y ranges from 1 to 1,000;

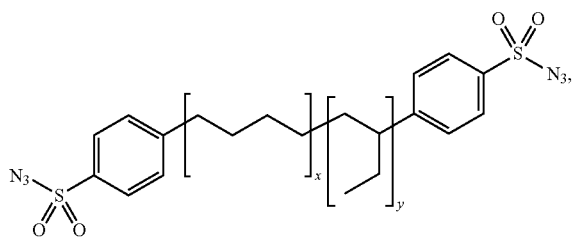

wherein x+y ranges from 1 to 1,000;

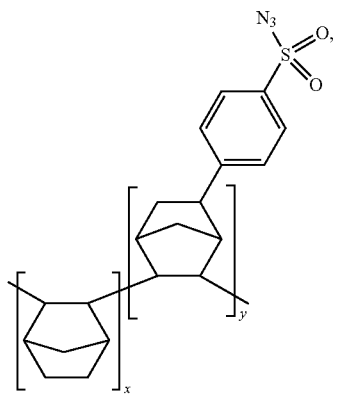

wherein x+y ranges from 1 to 1,000;

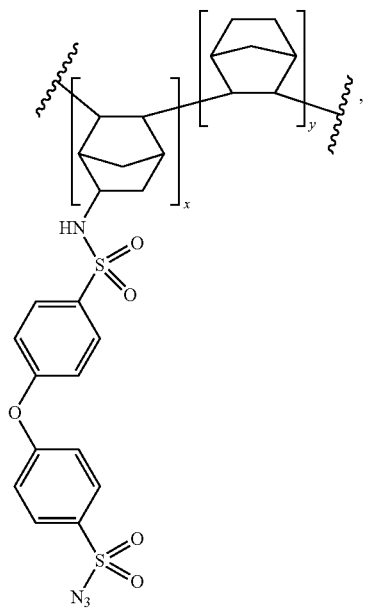

wherein x+y ranges from 1 to 1,000; or

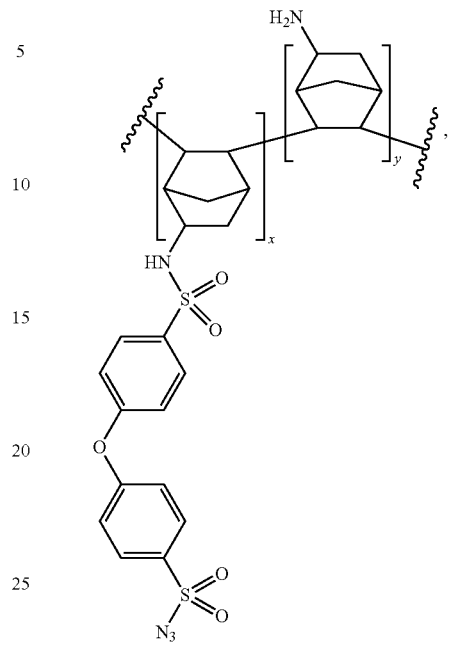

wherein x+y ranges from 1 to 1,000.

Suitable polymeric coupling agents are polymers having a number average molecular weight of less than 100,000 g/mol, for instance, less than 90,000 g/mol, less than 70,000 g/mol, less than 60,000 g/mol, less than 50,000 g/mol, or less than 20,000 g/mol; and having a number average molecular weight of greater than 500 g/mol, greater than 1,000 g/mol, greater than 5,000 g/mol, or greater than 10,000 g/mol. The polymer has a molecular weight distribution typically ranging from about 1.0 to about 10.0, for instance about 1.0 to about 9.0, about 1.0 to about 8.0, about 1.0 to about 7.0, about 1.0 to about 6.0, about 1.0 to about 5.0, about 1.0 to about 4.0, or about 1.0 to about 3.0.

The above-described polymeric coupling agents containing an aryl sulfonyl azide group as the reactive coupling group are different than polymeric coupling agents containing an an alkyl azide group, such as VPN, or an alkyl sulfonyl azide group as the reactive coupling group. Typically, aryl sulfonyl azides have a higher activity than alkyl azides, which is desirable for the coupling reaction to progress to completion during the typically short residence times of commercial polyolefin extrusion and pelletization processes. Aryl sulfonyl azides generally do not lead to side reactions that are typical for alkyl azides, such as an azide transfer to the polyolefins via radical mechanism, or the release of $SO_2$ gas with accompanying free radical generation and chain scission of the polyolefin. Therefore, the aryl sulfonyl azide group is a desirable reactive functional group for the polymeric coupling agent.

Preparation of the Polymeric Coupling Agent

The polymeric coupling agent can be prepared by a process comprising polymerizing a diene monomer, optionally with one or more comonomers, by solution-free radical polymerization, in the presence of an initiator that provides an aryl functional fragment and a solvent that does not act as a chain transfer agent, to form an aryl-terminated polydiene. The aryl-terminated polydiene is then reacted with a sulfonating agent to form an aryl sulfonyl-terminated polydiene, which is then reacted with an alkali metal azide to form an azide-modified polymeric coupling agent.

The aryl-terminated polydiene can be hydrogenated prior to sulfonation to provide an aryl-terminated hydrogenated polydiene. The aryl-terminated hydrogenated polydiene is then reacted with a sulfonating agent to form an aryl sulfonyl-terminated hydrogenated polydiene, which is then reacted with an alkali metal azide to form an azide-modified polymeric coupling agent.

Alternatively, the polymeric coupling agent can be prepared by a process comprising: polymerizing a diene monomer, optionally with one or more comonomers, by solution-free radical polymerization, in the presence of an initiator that provides a sulfonyl aryl functional fragment and a solvent that does not act as a chain transfer agent, to form a sulfonyl aryl-terminated polydiene. The sulfonyl aryl-terminated polydiene is then reacted with an alkali metal azide to form an azide-modified polymeric coupling agent.

Suitable diene monomers contain 4 to 10 carbon atoms, for instance, 4 to 8 carbon atoms. Exemplary diene monomers are butadiene, isoprene (e.g., 2-methyl-1,3-butadiene), 2-isopropyl-1,3-butadiene, and chloroprene (2-chloro-1,3-butadiene). Typical diene monomers are isoprene or butadiene.

To prepare a copolymer as the polymeric coupling agent, one or more comonomers are polymerized with the diene monomer. Typical comonomers are acrylonitrile and styrene. For instance, a butadiene monomer can be polymerized with one or more acrylonitrile or styrene comonomers.

The initiators can be an azo initiator or peroxide initiator. Suitable initiators are those that can dissociate during the polymerization process to provide either an aryl functional fragment or a sulfonyl aryl functional fragment to functionalize the polydiene.

Exemplary initiators that provide an aryl functional fragment include azobenzene, azocumene, and dibenzoyl peroxide. The initiator can provide an aryl functional fragment to form an aryl-terminated polydiene. Typical initiator is dibenzoyl peroxide, which provides a phenyl functional fragment.

Exemplary initiators that provide a sulfonyl aryl functional fragment include 4,4'-azobenzenesulfonic acid and 4,4'-(dioxydicarbonyl)bisbenzenesulfonic acid. The initiator can provide a sulfonyl aryl functional fragment to form a sulfonyl aryl-terminated polydiene. Typical initiator is 4,4'-azobenzenesulfonic acid, which provides a benzenesulfonic acid (i.e., a sulfonyl phenyl) functional fragment.

Suitable diazo initiators also include those having the formula of

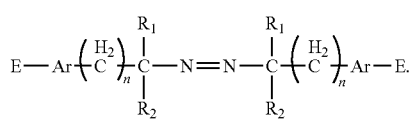

In this formula, n is an integer of 0-6. $R_1$ and $R_2$ are each independently an alkyl, aryl, cyano, or carboxyl. Each Ar independently represents an aryl group containing 6-16 carbon atoms. E is a sulfonyl azide or a sulfur-containing functional group that can be converted to a sulfonyl azide, for instance, a sulfur-containing functional group selected from the group consisting of

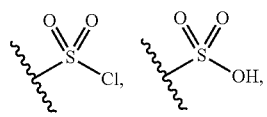

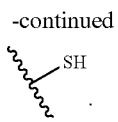

M is a metal cation, such as an alkali metal cation (e.g., a sodium cation). An exemplary diazo initiator is

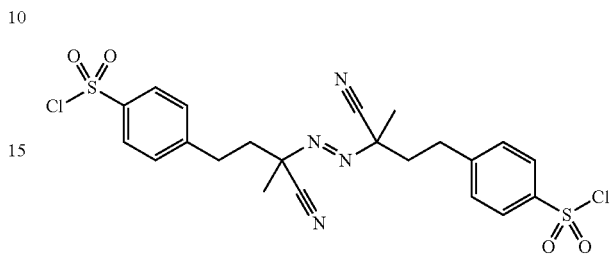

(see Bessiere et al., Macromol. Chem. Phys., 195, 845-853 (1994), which is herein incorporated by reference in its entirety).

These diazo initiators would dissociate at the polymerization conditions into nitrogen gas and free radicals represented by the following formula:

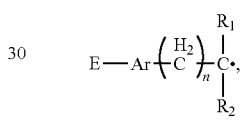

in which the variables n, $R_1$, $R_2$, Ar, and E are the same as defined above. These free radicals combine with free ends of the growing polymer chains at the rate of one free radical per polymer chain end, forming a polymer terminated at both ends by

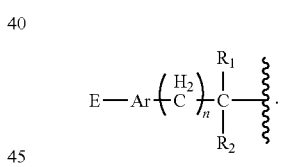

Suitable solvents are those that do not act as a chain transfer agent, i.e., they do not participate in the radical polymerization reaction. Exemplary solvents are alcohols, esters, ethers, and ketones. For instance, the solvent can be t-butanol, methanol, ethanol, acetone, methyl ethyl ketone, 2-pentanone, 3-pentanone, or methyl isobutyl ketone. A typical solvent is acetone.

Any sulfonating agents capable of introducing a sulfonyl group into the aryl-terminated polydiene can be used to form a sulfonyl aryl-terminated polydiene. Suitable sulfonating agents include concentrated sulfuric acid, sulfur trioxide, metallic sulfates, sulfamic acid, and chlorosulfonic acid. Typically, chlorosulfonic acid is used as the sulfonating agent.

Exemplary alkali metal azides are $NaN_3$, $KN_3$, $RbN_3$, and $CsN_3$. Typically, the alkali metal azide used is sodium azide.

By the above process, the polymeric coupling agent can be modified at one or both terminal ends of the polymer chain to form an azide-modified polymeric coupling agent. Alternatively, one or more repeating units of the polymeric coupling agent can be azide-modified by the above process.

The polymeric coupling agent can also be prepared by a process comprising reacting a polymer terminated with a carboxylic group with the carboxylic-reactive group X of a functionalized linking moiety having the structure of X-L-Q, to attach the linking moiety Q-L to the polymer. The polymer is typically a homopolymer of an olefin monomer or derivative thereof, or a copolymer of an olefin monomer and one or more olefin comonomers defined supra. The carboxylic group can be a carboxylic acid or carboxylic ester.

X is a carboxylic-reactive group containing a heteroatom selected from the group consisting of nitrogen, oxygen, and sulfur. For instance, X is —NR$_2$R$_3$R$_4$, an ammonium salt, —SR$_2$, or —OR$_2$, wherein each R$_2$, R$_3$, and R$_4$ are independently H, alkyl, or aryl. L is a linking moiety comprising one or more of —O—, —C(O)—, aryl, alkyl,

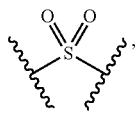 [SMILES: *S(*)(=O)=O]

and combinations thereof. Q is an azide-reactive group selected from the group consisting of halogen, —OH, —O—, alkoxide, —OC(O)R$_1$, fluoroalkoxide, and fluoroaryl, wherein R$_1$ is alkyl or aryl. Exemplary linking molecule X-L-Q is 4-(2-aminoethyl)benzenesulfonic acid.

The Q group (i.e., the azide-reactive group) of the resulting linking moiety-attached polymer is then reacted with an alkali metal azide to form an azide-modified polymeric coupling agent. Exemplary alkali metal azides are NaN$_3$, KN$_3$, RbN$_3$, and CsN$_3$. Typically, the alkali metal azide used is sodium azide.

In one embodiment, the polymer has one or more terminal ends functionalized with the carboxylic group, so that one or more terminal ends of the polymer can be attached with the linking moiety Q-L and can be reacted with the alkali metal azide, resulting one or more terminal ends of the polymer being modified by an azide functional group.

In one embodiment, one or more repeating units of the polymer is functionalized with the carboxylic group, so that the linking moiety Q-L is attached to the polymer as one or more pendent groups, and can be further reacted with the alkali metal azide, resulting the polymer containing one or more azide-modified pendent groups.

Accordingly, by the above process, the polymeric coupling agent can be modified at one or both terminal ends of the polymer chain to form an azide-modified polymeric coupling agent. Alternatively, one or more repeating units of the polymeric coupling agent can be azide-modified by the above process.

One aspect of the invention relates to a process for preparing a polymeric coupling agent. The process comprises providing an aryl-containing norbornene-based polymer, such as polynorbornene. The aryl-containing norbornene-based polymer is then reacted with a sulfonating agent to form a sulfonyl aryl-containing norbornene-based polymer, which is then reacted with an alkali metal azide to form an azide-modified polymeric coupling agent.

Suitable norbornene-based polymers include those described above. In one embodiment, the norbornene-based polymer is a polymer comprising one or more repeating units of:

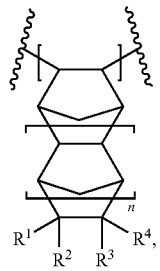

wherein:
R$^1$, R$^2$, R$^3$, and R$^4$ are each independently selected from the group consisting of hydrogen; halogen; —OR$^5$; —C(O)OR$^5$; —OC(O)R$^5$; —NR$^5$R$^6$; —ONR$^5$R$^6$; —N(R$^5$)OR$^6$; —SR$^5$; —C(S)SR$^5$; —SC(S)R$^5$; —SC(S)NR$^5$R$^6$; —SC(O)SR$^5$; —SC(S)SR$^5$; —OSiR$^5$R$^6$R$^7$; —C≡C—R$^5$; epoxide; peroxide; alkyl borane; isocyanate; silanes; a hydrocarbyl or halohydrocarbyl group selected from the group consisting of linear or branched C$_1$-C$_{16}$ alkyl, perfluoroalkyl, C$_3$-C$_{12}$ cycloalkyl, C$_6$-C$_{12}$bicycloalkyl, C$_7$-C$_{14}$ tricycloalkyl, aryl, arylalkyl, perfluoroaryl, and perfluoroarylalkyl; —NH—Y$_1$—R$^8$—Y$_2$—N$_3$; and —X-aryl-SO$_2$N$_3$;

Y$_1$ and Y$_2$ are each independently absent,

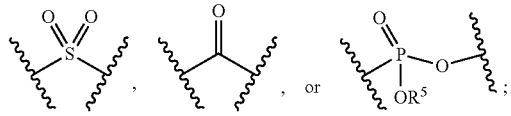

X is selected from the group consisting of: alkyl, aryl, ether, —NH—, —NHSO$_2$—, —O—, —CO, —C(O)O, —OC(O), —OC(O)O—, —S, —(CR$^5$R$^6$)$_a$—, —O(CR$^5$R$^6$)$_a$—, —(CR$^5$R$^6$)$_a$O—, —(CR$^5$R$^6$)$_a$O(SiR$^5$R$^6$)$_a$—, —(CR$^5$R$^6$)$_a$O(CR$^5$R$^6$)$_a$—, —C(O)(CR$^5$R$^6$)$_a$—, —(SiR$^5$R$^6$)$_a$O(SiR$^5$R$^6$)$_a$—, —(CR$^5$R$^6$)$_a$C(O)—, —C(O)O(CR$^5$R$^6$)$_a$—, —(CR$^5$R$^6$)$_a$C(O)O—, —OC(O)(CR$^5$R$^6$)$_a$—, —(CR$^5$R$^6$)$_a$OC(O)—, —(CR$^5$R$^6$)$_a$OC(O)$_a$—, —(CR$^5$R$^6$)$_a$OC(O)O(CR$^5$R$^6$)$_a$—, —OC(O)O(CR$^5$R$^6$)$_a$—, —S(CR$^5$R$^6$)$_a$—, —(CR$^5$R$^6$)$_a$S—, —(SiR$^5$R$^6$)$_a$—, —O(SiR$^5$R$^6$)$_a$—, and —(SiR$^5$R$^6$)$_a$O—;

R$^5$, R$^6$, and R$^7$ are each independently hydrogen, linear or branched C$_1$-C$_{12}$ alkyl, or aryl;
R$^8$ is absent, aryl, alkyl, or diarylether;
a is an integer from 0 to 12; and
n is 0, 1, or 2.

The norbornene-based polymer can contain one or more aryl groups covalently bonded to one or more terminal ends of the polymer chain. The norbornene-based polymer may contain one or more aryl groups covalently bonded to one or more repeating units of the polymer as pendent groups. In one embodiment, the aryl group is phenyl.

In certain embodiments, the aryl-containing norbornene-based polymer is an aryl-terminated norbornene-based polymer. In one embodiment, the norbornene-based polymer is terminated with aryl groups at both terminal ends of the polymer chain. The polymeric coupling agent is thus azide-modified at both terminal ends.

The aryl-terminated norbornene-based polymer can be provided by polymerizing a norbornene-based monomer, optionally with one or more comonomers, by solution-free radical polymerization, in the presence of an initiator that provides an aryl functional fragment and a solvent that does not act as a chain transfer agent, to form an aryl-terminated norbornene-based polymer. For instance, the polymerizing step can comprise polymerizing a norbornene monomer with one or more comonomers selected from the group consisting of acrylonitrile and styrene.

Suitable initiators that can provide an aryl functional fragment used in the polymerizing reaction include those described above. For instance, exemplary initiators that can provide an aryl functional fragment are azobenzene, azocumene, and dibenzoyl peroxide. Typical initiator is dibenzoyl peroxide, which provides a phenyl functional fragment.

Suitable diazo initiators also include those having the formula of

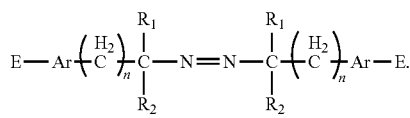

In this formula, n is an integer of 0-6. $R_1$ and $R_2$ are each independently an alkyl, aryl, cyano, or carboxyl. Each Ar independently represents an aryl group containing 6-16 carbon atoms. E is H or

Exemplary diazo initiators that can provide an aryl functional fragment are

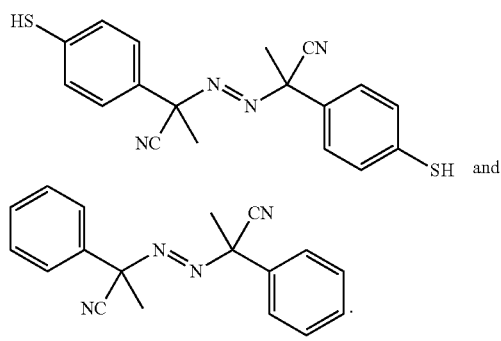

In certain embodiments, the aryl-containing norbornene-based polymer is an aryl-pendent norbornene-based copolymer comprising repeating units of one or more norbornene-based monomers and one or more of

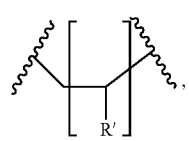

wherein R' is aryl. In one embodiment, the aryl pendent groups are present at two or more repeating units of the norbornene-based copolymer. That is to say, the aryl-pendent norbornene-based copolymer comprises two or more of

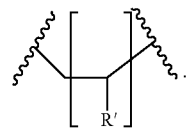

The polymeric coupling agent is thus azide-modified at two or more repeating units of the norbornene-based copolymer.

Suitable solvents for the polymerizing reaction include those discussed above that do not act as a chain transfer agent. For instance, exemplary solvent may be selected from the group consisting of t-butanol, methanol, ethanol, acetone, methyl ethyl ketone, 2-pentanone, 3-pentanone, and methyl isobutyl ketone.

The aryl-containing norbornene-based polymer (e.g., the aryl-terminated or aryl-pendent norbornene-based polymer) can be reacted with a sulfonating agent to form a sulfonyl aryl-containing norbornene-based polymer, which is then reacted with an alkali metal azide to form an azide-modified polymeric coupling agent.

The sulfonating functionalization of the aryl group can be one step. For instance, when the sulfonating agent is a chlorosulfonating agent, the aryl-containing norbornene-based polymer can be reacted with the chlorosulfonating agent, such as chlorosulfonic acid, to form sulfonyl chloride groups, at one or both terminal ends of the norbornene-based polymer chain, and/or at one or more of the repeating units of the norbornene-based polymer. The resulting sulfonyl chloride functionalized norbornene-based polymer is reacted with an azidification agent, such as an alkali metal azide, to produce sulfonyl azide groups, resulting in an aryl sulfonyl azide functionalized polymeric coupling agent.

Alternatively, the sulfonating functionalization of the aryl group can be two or more steps. For instance, when the sulfonating agent is sulfuric acid, the aryl-containing norbornene-based polymer can be first reacted with sulfuric acid to form sulfonic acid groups, optionally followed by reacting with a base such as sodium hydroxide to form sulfonate groups, at one or both terminal ends of the norbornene-based polymer chain, and/or at one or more of the repeating units of the norbornene-based polymer. The resulting sulfonyl (sulfonic acid or sulfonate) functionalized norbornene-based polymer is then further reacted with a chlorinating agent, such as a thionyl chloride, to form sulfonyl chloride groups, at one or both terminal ends of the norbornene-based polymer chain, and/or at one or more of the repeating units of the norbornene-based polymer. The resulting sulfonyl chloride functionalized norbornene-based polymer is reacted with an azidification agent, such as an alkali metal azide, to produce sulfonyl azide groups, resulting in an aryl sulfonyl azide functionalized polymeric coupling agent.

Suitable alkali metal azides include those described above. Typically, the alkali metal azide used is sodium azide.

Another aspect of the invention relates to a process for preparing a polymeric coupling agent. The process comprises polymerizing a norbornene-based monomer, such as norbornene, optionally with one or more comonomers, by solution-free radical polymerization, in the presence of an initiator that provides a sulfonyl aryl functional fragment and a solvent that does not act as a chain transfer agent, to form a sulfonyl aryl-terminated norbornene-based polymer, such as sulfonyl aryl-terminated polynorbornene. The sulfonyl aryl-terminated norbornene-based polymer is then reacted with an alkali metal azide to form an azide-modified polymeric coupling agent.

Suitable norbornene-based monomers include norbornene or norbornene derivatives falling within the generic structure of the norbornene-based monomers discussed above.

In one embodiment, the polymerizing step comprises polymerizing one or more norbornene-based monomers.

In one embodiment, the polymerizing step comprises polymerizing one or more norbornene-based monomers with one or more comonomers selected from the group consisting of acrylonitrile and styrene.

Suitable initiators that provide a sulfonyl aryl functional fragment include those described above. For instance, exemplary initiators that provide a sulfonyl aryl functional fragment are 4,4'-azobenzenesulfonic acid (e.g., it provides a benzenesulfonic acid (i.e., a sulfonyl phenyl) functional fragment) and 4,4'-(dioxydicarbonyl)bisbenzenesulfonic acid.

Suitable diazo initiators also include those having the formula of

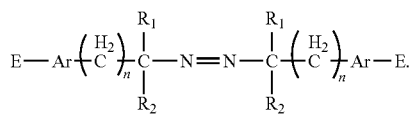

In this formula, n is an integer of 0-6. $R_1$ and $R_2$ are each independently an alkyl, aryl, cyano, or carboxyl. Each Ar independently represents an aryl group containing 6-16 carbon atoms. E is a sulfonyl azide or a sulfur-containing functional group that can be converted to a sulfonyl azide, for instance, a sulfur-containing functional group selected from the group consisting of

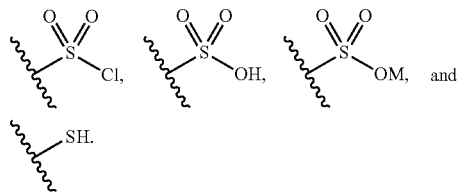

M is a metal cation, such as an alkali metal cation (e.g., a sodium cation). An exemplary diazo initiator is

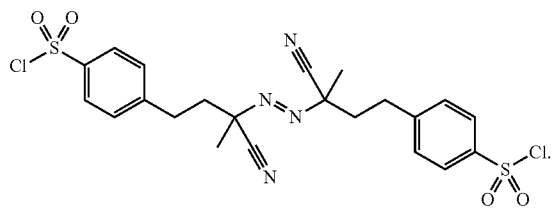 [SMILES: CC(C#N)(CCc1ccc(S(=O)(=O)Cl)cc1)/N=N/C(C)(C#N)CCc1ccc(S(=O)(=O)Cl)cc1]

The sulfonyl aryl-terminated norbornene-based polymer can be reacted with an alkali metal azide to form an azide-modified polymeric coupling agent.

In one embodiment, the norbornene-based polymer is terminated with sulfonyl aryl groups at both terminal ends of the polymer chain. The polymeric coupling agent is thus azide-modified at both terminal ends.

When E in the above formula is a sulfonyl azide, the initiator provides a sulfonyl azide aryl functional fragment, and the polymerizing reaction forms an aryl sulfonyl azide-terminated norbornene-based polymer and, thus, forming an azide-modified polymeric coupling agent. The step of reacting with an alkali metal azide is not needed in this embodiment.

When the initiator provides an aryl sulfonyl chloride functional fragment, and the polymerizing reaction forms an aryl sulfonyl chloride-terminated norbornene-based polymer (e.g., when E in the above formula is

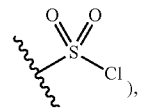

the polymer is reacted with an azidification agent, such as an alkali metal azide, to produce sulfonyl azide groups, resulting in an aryl sulfonyl azide functionalized polymeric coupling agent.

When the initiator provides an aryl sulfonic acid or aryl sulfonate functional fragment (e.g., when E in the above formula is

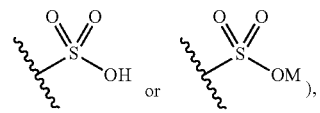

after the polymerizing step, the polymer can be reacted with a chlorinating agent, such as a thionyl chloride, to form aryl sulfonyl chloride-terminated norbornene-based polymer, which can then be reacted with an azidification agent, such as an alkali metal azide, to produce sulfonyl azide groups, resulting in an aryl sulfonyl azide functionalized polymeric coupling agent.

When the initiator provides a thio aryl functional fragment (e.g., when E in the above formula is

after the polymerizing step, the polymer can be reacted with an oxidizing agent, such as oxone (potassium peroxymonosulfate) optionally combined with potassium chloride, to form aryl sulfonyl-terminated norbornene-based polymer, which can then be reacted with an azidification agent, such as an alkali metal azide, to produce sulfonyl azide groups, resulting in an aryl sulfonyl azide functionalized polymeric coupling agent.

Suitable alkali metal azides include those described above. Typically, the alkali metal azide used is sodium azide.

Suitable solvents for the polymerizing reaction include those discussed above that do not act as a chain transfer agent. For instance, exemplary solvent may be selected from the group consisting of t-butanol, methanol, ethanol, acetone, methyl ethyl ketone, 2-pentanone, 3-pentanone, and methyl isobutyl ketone.

Molecular Coupling Agent

One or more molecular coupling agents can be blended with the polymeric coupling agent. If the polymeric coupling agents have relatively high thermal stability, a molecular coupling agent may be used to promote the coupling reaction between the polyolefin base polymer (a) and the polymeric coupling agent. For instance, these molecular coupling agents can be added to promote the coupling reaction by generating radicals at a lower temperature thereby promoting the coupling reaction.

Exemplary molecular coupling agents include peroxides, such as di(4tert-butylcyclohexyl) peroxydicarbonate, di(tert-butylperoxyisopropyl)benzene, di(tert-butylperoxyisopropyl)benzene, di(4-methylbenzoyl) peroxide, dicetyl peroxydicarbonate, dimyristyl peroxydicarbonate, dicumyl peroxide, dibenzoyl peroxide, diisopropyl peroxydicarbonate, tert-butyl monoperoxymaleate, didecanoyl peroxide, dioctanoyl peroxide, 2,5-dimethyl-2,5-di(tert-butylperoxy) hexane, tert-butylperoxy-2-ethylhexyl carbonate, tert-amyl peroxy-2-ethylhexanoate, tert-amyl peroxyneodecanoate, tert-amyl peroxypivalate, tert-amyl peroxybenzoate, tert-amyl peroxyacetate, di-sec-butyl peroxydicarbonate, di(2-ethylhexyl) peroxydicarbonate, tert-butyl cumyl peroxide or combinations of these non-limiting examples; an alkyl borane, such as triethylborane, trimethylborane, tri-n-butylborane, triisobutylborane, diethylborane methoxide, or diethylborane isopropoxide or combinations of these non-limiting examples; azo compounds such as azobisisobutyronitrile (AIBN) or 1,1'-azobis(cyclohexanecarbonitrile) (ABCN), 1,1'-azodi(hexahydrobenzonitrile, 2,2'-Azodi (hexahydrobenzonitrile, 2,2'-azodi(2-methylbuttyronitrile, or combinations of these non-limiting examples; azide compounds such as 4,4'-oxybis(benzenesulfonyl azide), 4-dodecylbenzensulfonyl azide, benzenesulfonyl azide, 4-(2-trimethoxysilylethyl) benzenesulfonyl azide, 4-methylbenzenesulfonyl azide, 2,4,6-triisopropylbenzene-sulfonyl azide, 1,3-benzenedisulfonyl azide, 1,4-benzene-disulfonyl azide; or combinations of these non-limiting examples.

The above-described polymeric coupling agent and polymeric/molecular coupling agent blend are different than a coupling agent based on molecular aryl azides or molecular sulfonyl azides, such as 4,4'-oxybis(benzenesulfonyl azide), used in a blend with an inert additive (e.g., Irganox 1010). By using a polymeric coupling agent having azide group at one or more terminal ends of the modified polyolefin, various aspects over using a molecular coupling agent can be improved, from the process to the final product.

For instance, when preparing a long-chain branched polypropylene using 4,4'-oxybis(benzenesulfonyl azide) as a coupling agent, the process typically involves the preparation of a blend of the 4,4'-oxybis(benzenesulfonyl azide) with an inert additive (e.g., Irganox 1010), which aims to dilute the molecular azide compound to avoid rapid decomposition. To activate 4,4'-oxybis(benzenesulfonyl azide) blended with the inert additive, the extrusion reactive conditions typically involve heating to 230° C. and having the molecular coupling agent (i.e., 4,4'-oxybis(benzenesulfonyl azide) at a concentration of at least 1625 ppm (1.6 g/kg of polypropylene). However, the polymeric coupling agent containing an azide group at one or more terminal ends of the modified polyolefin described in this invention, does not need to be dispersed in an inert medium, such as the anti-oxidant Pentaerythritol Tetrakis(3-(3,5-di-tert-butyl-4-hydroxyphenyl)propionate). Thus, the coupling reaction between the polyolefin base polymer (a) and the polymeric coupling agent can take place without the presence of an inert component.

Employing 4,4'-oxybis(benzenesulfonyl azide) as a molecular coupling agent promotes a shorter linkage, whereas a polymeric coupling agent having an azide group at one or more terminal ends of the polymeric coupling agent chain may promote the formation of a longer linkage between two base polyolefin chains. Employing a polymeric coupling agent containing azide groups at all terminal ends may also promote the formation of a crosslinked or hyperbranched structure in the resulting long-chain branched polymer.

The relatively higher thermal stability of the polymeric coupling agent, as compared to the molecular coupling agent (e.g., 4,4'-oxybis(benzenesulfonyl azide)), provides an improved performance and safety in the handling process. Thus, the polymeric coupling agent can be handled as a normal polyolefin powder, rather than being dispersed in an inert matrix. For instance, as discussed in Example 1, VPN samples are stable at temperatures below 190° C., which is safe for handling and storage at industrial scales.

Additionally, using a polymeric coupling agent having an azide group at one or more terminal ends shows a better compatibility with the base polymer, avoiding blooming issues—migration of the additive to the polymer surface—which may occur when using blends of 4,4'-oxybis(benzenesulfonyl azide) and inert materials (e.g., Pentaerythritol Tetrakis(3-(3,5-di-tert-butyl-4-hydroxyphenyl)propionate)).

Reaction Conditions

The reaction temperature of the coupling reaction between the polyolefin base polymer (a) the coupling agent (b) (containing polymeric coupling agent or polymeric/molecular coupling agent blend) can be greater than 140° C., or greater than 220° C. Typically, the coupling reaction occurs at or above the first decomposition temperature of the polymeric coupling agent or the polymeric/molecular coupling agent blend, but less than 350° C. For instance, the first decomposition temperature of the polymeric coupling agent, such as VPN, is 190° C. or higher. On the other hand, a polymeric/molecular coupling agent blend can have a decomposition temperature of 140° C. or higher. The decomposition temperature may be determined by Thermal Gravimetric Analysis (TGA) or other means known to one skilled in the art. TGA measurements and thermogram of the exemplary polymeric coupling agent and polymeric/molecular coupling agent blends, are provided in Examples 1-6, in which the decomposition curves were analyzed and displayed in FIGS. 3 and 8, and Table 1.

The azide-containing modified polyolefin can decompose in several ways. (The process of the invention is not intended to be bound by different reaction mechanisms.) As an example, insertion of the azide-containing polymeric coupling agent into a polyolefin base polymer (a) generally occurs through the thermal decomposition of the azide group. At or above the first decomposition temperature of the azide-containing polymeric coupling agent or the first decomposition temperature of the polymeric/molecular coupling agent blend, the polymeric coupling agent generates nitrene species (aza derivatives), acting as an efficient coupling agent to react with the polyolefin base polymer (a). See, e.g., the reaction scheme in Scheme 1.

Scheme 1.

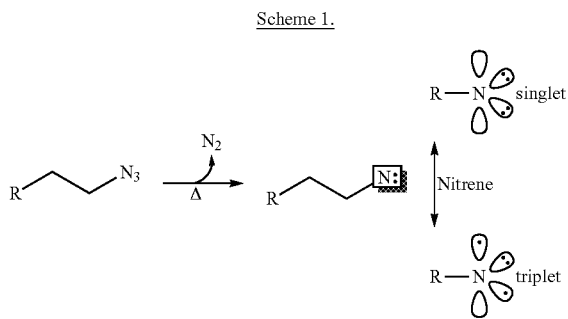

Advantageously, at or above the first decomposition temperature of the azide-containing polymeric coupling agent or the first decomposition temperature of the polymeric/molecular coupling agent blend, the azide-containing polymeric coupling agent is capable of a self-coupling reaction (in the polymeric coupling agent or the polymeric/molecular coupling agent blend), in which the formed nitrene reacts with other polymeric coupling agent chains. Thus, in certain embodiments, the polymeric coupling agent self-couples to form a self-coupled coupling agent capable of reacting with the polyolefin base polymer (a).

The polyolefin base polymer (a) and the coupling agent (b) can be admixed, or otherwise combined, under conditions which allow for sufficient mixing before or during the coupling reaction. Admixing of the polyolefin base polymer (a) the coupling agent (b) can be accomplished by any means known to one skilled in the art. During the admixing/combining, it is desirable to have as homogeneous a distribution as possible, to achieve solubility of the coupling agent in the polyolefin melt, and to avoid uneven amounts of localized reactions. The resulting admixture can be subjected to heating step to initiate the reaction.

For example, the coupling reaction can occur by subjecting the polyolefin base polymer (a) the coupling agent (b) to a melt process to blend the polyolefin and coupling agent to achieve the reaction. The term "melt processing" is used to mean any process in which polymers, such as the polyolefin base polymer (a) or the coupling agent (b), are melted. Melt processing includes extrusion, pelletization, film blowing or casting, thermoforming, compounding in polymer melt form, fiber spinning, or other melt processes.

Any equipment suitable for a melt processing can be used as long as it provides sufficient mixing and temperature control. For instance, a continuous polymer processing system such as an extruder, a static polymer mixing device such as a Brabender blender, or a semi-continuous polymer processing system, such as a BANBURY mixer, can be used. The term "extruder" is used for its broadest meaning, to include any machine for polyolefin extrusion. For instance, the machine can extrude polyolefin in the form of powder or pellets, sheets, fibers, or other desired shapes and/or profiles. Generally, an extruder operates by feeding material through the feed throat (an opening near the rear of the barrel) which comes into contact with one or more screws. The rotating screw(s) (normally turning at up to 120 rpm) forces the polyolefin forward into one or more heated barrels (e.g., there may be one screw per barrel). In many processes, a heating profile can be set for the barrel in which three or more independent proportional-integral-derivative controller (PID)-controlled heater zones can gradually increase the temperature of the barrel from the rear (where the plastic enters) to the front.

The process of the invention can take place in a single-vessel, i.e., the mixing of the polyolefin base polymer (a) the coupling agent (b) takes place in the same vessel that heats the mixture to the decomposition temperature of the coupling agent(s). It can be, for instance, a single-screw or a twin-screw extruder, or a batch mixer. Further descriptions about extruders and processes for extrusion can be found in U.S. Pat. Nos. 4,814,135; 4,857,600; 5,076,988; and 5,153,382; all of which are incorporated herein by reference.

The reaction vessel can have more than one zone of different temperatures into which a reaction mixture would pass: the first zone can be at a temperature of at least the crystalline melt temperature or the softening temperature of the polyolefin base polymer(s) (a) and the second zone can be at a temperature sufficient for the decomposition of the coupling agent (b). It is desirable that the first zone is at a temperature of less than the decomposition temperature of the coupling agent, but sufficiently high to soften the polyolefin and allow it to combine with the coupling agents (b) through distributive mixing to a substantially uniform admixture.

When a melt extrusion is used, the reaction can take place during the melt extrusion step. The heat produced during the extrusion step provides the energy necessary to cause the reaction between the coupling agents (b) with the polyolefin base polymer (a). A temperature at or above the decomposition temperature of the coupling agents (b) may be maintained for a time sufficient to result in decomposition of the coupling agent so that at least 50 wt %, at least 60 wt %, at least 70 wt %, at least 80 wt %, at least 90 wt %, or at least 95 wt % of the coupling agent is reacted. For instance, the residence time may be at least 1 second, at least 3 seconds, at least 5 seconds, at least 10 seconds, or at least 15 seconds, to avoid unreacted coupling agent, and subsequent undesirable reactions, or to avoid the need for possible destructively high temperatures. Typically, the reaction time is 15-90 seconds.

One skilled in the art understands that a polyolefin or mixtures thereof typically melts over a temperature range rather than sharply at one temperature. Thus, it may be sufficient that the polyolefin be in a partially molten state. The melting or softening temperature ranges can be approximated from the differential scanning calorimeter (DSC) curve of the polyolefin or mixtures thereof.

Improved incorporation of the coupling agents (b) can be achieved by blending a solution or fluid form of the coupling agents (b) into the polyolefin phase, to allow the polyolefin to blend the coupling agents (b). If there is solvent in the mixture, solvent is evaporated and the resulting mixture is extruded. The solvents used can be polar solvents such as acetone, THF (tetrahydrofuran), or non-polar compounds such as mineral oils, toluene, hexane, heptane, cyclohexane, benzene, and other hydrocarbons which the coupling agent is sufficiently miscible to disperse the coupling agent in a polyolefin.

Alternatively, the coupling reaction between the polyolefin base polymer (a) and the coupling agent (b) can take place under solventless reaction conditions. The coupling reaction can be carried out in a bulk phase, to avoid later steps for removal of the solvent or other medium.

Alternatively, the coupling agents (b) can be added to the post-reactor area of a polymer processing plant, to avoid the extra step of re-extrusion and the cost associated with it and to ensure that the coupling agents (b) are well blended into the polyolefin base polymer. For instance, after the polyolefin is produced in a slurry process, the coupling agents (b) can be added in powder or liquid form to the powdered polyolefin after the solvent is removed by decantation and prior to the drying and densification extrusion process. In an alternative embodiment, when a polyolefin is prepared in a gas phase process, the coupling agents (b) can be added in powder or liquid form to the powdered polyolefin before the densification extrusion. In an alternative embodiment, when a polyolefin is made in a solution process, the coupling agent (b) can be added to the polyolefin solution prior to the densification extrusion process.

The kinetics of the coupling reaction depend upon the molecular structure of the coupling agent (e.g., the chemical composition of the azide groups), whether a molecular coupling agent (e.g., peroxides and/or azides) is added/blended to the polymeric coupling agent, the processing conditions (the temperature of the reaction system, the type of reaction vessels, and residence times, etc.), and other variables appreciated by one skilled in the art.

Long-Chain Branched Polymers

Another aspect of the invention relates to a long-chain branched polymer prepared according to the processes as discussed in the above embodiments. The long-chain branched polymer is formed by reacting (a) a polyolefin base polymer with (b) coupling agent comprising a polymeric coupling agent, optionally blended with a molecular coupling agent, the polymeric coupling agent being a modified polyolefin having a reactive coupling group at one or more terminal ends of the modified polyolefin chain, to couple the polyolefin base polymer (a) with the coupling agent (b). Suitable polyolefin base polymers (a), polymeric coupling agent and polymeric/molecular coupling agent blends, reactive coupling groups, and non-reactive functional groups (i.e., non-reactive with the base polyolefin and with the polymeric coupling agent itself, but can be reactive to other groups or materials, such as inorganic materials), as well as suitable coupling reaction conditions for preparing these long-chain branched polymers are the same as those descriptions relating to the process as discussed in the above embodiments. The resulting long-chain branched polymer depends upon the starting materials and reaction conditions used.

In one embodiment, one or more terminal ends of the modified polyolefin chain contains a reactive coupling group or non-reactive functional group (e.g., R in formula (I)) selected from the group consisting of peroxides, alkyl boranes, halogens, thiols, amines, amides, aldehydes, alcohols, carboxylic acids, esters, isocyanates, silanes, phosphorous-containing groups, dithioesters, dithiocarbamates, dithiocarbonates, trithiocarbonates, alkoxyamines, aryl sulfonyl halides, aryl sulfonyl azides, vinyl, dienes, porphyrins, dyes, alkyl azides or derivatives thereof.

The polyolefin base polymer (a) can contain one or more binding sites along the polyolefin chain. Accordingly, in the resulting long-chain branched polymer, one or more modified polyolefins of the polymeric coupling agent or the polymeric/molecular coupling agent blend may be covalently bonded at one or more binding sites along the chain of the polyolefin base polymer (a).

As discussed above, the modified polyolefin of the polymeric coupling agent or the polymeric/molecular coupling agent blend can self-couple to form a self-coupled coupling agent (i.e., each polymeric coupling agent can couple with each other to form a longer coupling agent containing one or more modified polyolefin chains). This self-coupled coupling agent, when covalently bonded to the polyolefin base polymer chain, can introduce elongated long-chain branches and branches upon branches into the polyolefin base polymer. Thus, in the resulting long-chain branched polymer, one or more binding sites along the chain of the base polymer, polyolefin (a), can contain a long-chain branch that covalently links one or more modified polyolefin chains.

Accordingly, in certain embodiments, the resulting long-chain branched polymer contains branched chains resulting from both the reaction of the polyolefin base polymer (a) with the coupling agent, and the reaction of the polyolefin base polymer (a) with the self-coupled polymeric coupling agent. The resulting long-chain branched polymer may be a cross-linked or a hyperbranched polyolefin, based on the distribution of the reactive groups on the polymeric coupling agent (or polymeric/molecular coupling agent blend), and the self-coupling reaction of the polymeric coupling agent (or polymeric/molecular coupling agent blend).

Another aspect of the invention relates to a long-chain branched polymer, comprising a polyolefin base polymer that contains one or more long-chain branches formed by covalently bonding one or more polymeric coupling agents at one or more binding sites along the polyolefin base polymer chain.

The polymeric coupling agents can be a modified polyolefin having a reactive coupling group at one or more terminal ends of the modified polyolefin chain, prior to covalently bonding to the polyolefin base polymer.

Suitable polyolefin base polymers (a), polymeric coupling agents (or polymeric/molecular coupling agent blends) are the same as those discussed in the above embodiments.

In certain embodiments, in the long-chain branched polymer, at least one long-chain branch along the base polyolefin chain is formed by self-coupling two or more polymeric coupling agents. Thus, one or more long-chain branches introduced into one or more binding sites along the polyolefin base polymer chain can contain two or more polyolefins covalently bonded together through self-coupling the two or more polymeric coupling agents. The resulting long-chain branched polymer may contain crosslinked structures, which, may varies on the degree of crosslinking.

As the result of introducing a high degree of long-chain branches into polyolefins, the melt strength of the resulting long-chain branched polymer can be advantageously increased by the coupling reaction, as discussed in the above embodiments. The melt strength can be determined from $\langle r_g^2 \rangle^{1/2}$ ($R_g$, radius of gyration) and intrinsic viscosity [η] measured by size-exclusion chromatography (SEC) equipped with light scattering or viscosity detector, respectively. As a result of the formation of long-chain branches, the polymer becomes more compact in solution and the $R_g$ values decrease and η values increase by increasing the number of branches. Thus, the decreased values of $R_g$ and the increased values of η relative to the base polyolefin resin would indicate the formation of long-chain branches in the polymer. In this case, the number of branch points per molecule for the resulting long-chain branched polymer should be higher than zero. A melt tensile technique, such as Rheotens experiment, can also be used to indicate the result of melt strength of the polymer. Typically, values higher than 0.1N can be assigned to the formation of long-chain branched polypropylene, since force (F) is relative to the melt strength of the polymer.

Heterophasic Blend

The resulting long-chain branched polymer from the above-described processes can be further blended with a second polyolefin that is in a different phase than the long-chain branched polymer. This can result in a modified impact copolymer. In an automotive application (such as automotive parts like bumpers, body panels, dashboards, or door claddings), it is desirable to have a heterophasic blend of polymers, i.e., a polymer in a continuous phase and a polymer in a elastomeric, dispersed phase are blended. For instance, a blend of a polypropylene-based polymer (e.g., homopolymer polypropylene) and an ethylene-propylene copolymer (EPR) is a heterophasic blend, in which the polypropylene-based polymer is the continuous phase and the EPR is the dispersed phase. The polypropylene-based matrix delivers the stiffness of the material whereas the rubbery inclusions act as impact modifiers providing a grade with balanced stiffness-impact behavior. In one embodiment, the long-chain branched polymer is prepared from polypropylene as the base polyolefin (a), and can be used as a continuous phase of a heterophasic polymer blend. This long-chain branched polypropylene-based polymer is further blended with a second polyolefin that is in a different phase (i.e., elastomeric, dispersed phase) such as an EPR, to prepare a modified impact copolymer.

Uses of the Long-Chain Branched Polymer

The long-chain branched polymer prepared according to the processes of the invention may be formed into useful articles by standard forming methods known in the art, e.g., by blown film extrusion, cast film extrusion, injection or blow molding, pelletizing, foaming, thermoforming, compounding in polymer melt form, or fiber spinning. For example, any technique discussed above in the embodiments describing the melt processes can be used to prepare the long-chain branched polymer, thereby forming various useful articles, depending on the type of melt processing technique used.

For instance, the long-chain branched polymer may be useful in making films, such as blown films. The technique of blown film extrusion is known to one skilled in the art in the area of production of thin plastic films.

The long-chain branched polymer may also be used in coextruded films. The formation of coextruded blown films is known to one skilled in the art. The term "coextrusion" refers to the process of extruding two or more materials through a single die with two or more orifices arranged such that the extrudates merge together into a laminar structure, for instance, before chilling or quenching.

Coextruded blown films containing the long-chain branched polymer can be formed into pouches, bags, containers using packaging machinery known to one skilled in the art. Pouches, bags and other containers made from this combination of materials provide excellent toughness and impact strength and furthermore provide an excellent barrier to grease and oil and light hydrocarbons such as turpentine.

The long-chain branched polymer can also be useful in fabricating molded articles and fiber articles; in fabricating foams, wire cable, and profile extrusion; and in automotive applications, such as automotive parts like bumpers, body panels, dashboards, or door claddings.

Functionalization of Polyolefins and Compatibility with Inorganic Materials

The coupling reaction can also be used to functionalize a polyolefin using a modified polyolefin as a building block, and/or improve the compatibility of the polyolefin with inorganic materials. A polymeric coupling agent may have reactive coupling groups at one or more terminal ends of the modified polyolefin chain and one or more different non-reactive functional groups that are non-reactive with the polyolefin base polymer (a) and with the polymeric coupling agent itself. Suitable polymeric coupling agents and their reactive and non-reactive terminal groups are the same as those descriptions relating to the process as discussed in the above embodiments. One purpose of introducing a non-reactive functional group that does not react with the base polyolefin polymer or with the polymeric coupling agent is to improve the compatibility between the base polyolefin polymer and inorganic material for composite formation and improve the interaction between the base polyolefin polymer and inks/pigments for paintability.

Functionalizing polyolefins can be carried out by incorporation of bulky polar groups via a reaction with the reactive coupling group on one or more terminal ends of the polymeric coupling agent chain. The presence of the non-reactive functional group (i.e., non-reactive with the base polyolefin and with the polymeric coupling agent itself, but can be reactive to other groups or materials, such as inorganic materials) in at least one end of the polymer chain may disrupt surface energy of the final product after the coupling reaction, thereby improving the paintability, surface adhesion, compatibility with inorganic materials, and ultimately resulting in a functionalized polyolefin.

As noted above, the non-reactive functional group is non-reactive with the base polyolefin and with the polymeric coupling agent itself, but can be reactive to other groups or materials, such as inorganic materials. For example, during a reactive extrusion experiments, the starting materials can be a base polyolefin and a polymeric coupling agent comprised of an reactive group, such as azide, and a non-reactive functional group, such as maleic anhydride, at each end, respectively. The azide group would react with the base polyolefin polymer but the maleic anhydride group would not react with the base polyolefin polymer. In another experiment, the starting materials can be a base polyolefin polymer, the same polymeric coupling agent, and silica particles. In this experiment, the azide group reacts with the base polyolefin polymer, and the maleic anhydride group reacts with the hydroxyl groups on the surface of the silica particles. In the first example above, the maleic anhydride group acts as a modifier of the surface energy of the polymer, because this polar group would migrate to the surface of the polymer while one end is covalently bonded to the base polymer, which would increase the paintability. In the second example above, the maleic anhydride group improves the compatibility of the base polymer with an inorganic particle, which may also disrupt the surface energy due to inherent incompatibility of these two materials.

Accordingly, the process of the invention can further comprise the step of adding an inorganic material containing a polar group during the coupling reaction between the polyolefin base polymer (a) with the coupling agent (b) that includes a modified polyolefin.

Any inorganic material containing a polar group and capable of reacting with the coupling agent can be used. Suitable inorganic materials include, but are not limited to, glass fibers, inorganic fibers, functionalized silica nanoparticles, polyhedral oligomeric silsesquioxane (POSS), dyes, functionalized carbon nanotubes, clay, and combinations thereof.

Alternatively, another aspect of the invention relates to a process for preparing a composite containing a polyolefin and an inorganic material. The process comprises reacting (i) a polymeric coupling agent with (ii) an inorganic material containing a polar group and capable of reacting with the polymeric coupling agent to form a composite containing the polymeric coupling agent and inorganic material.

Suitable polymeric coupling agents and inorganic materials, as well as suitable coupling reaction conditions and reaction equipment are the same as those descriptions relating to the process as discussed in the above embodiments.

Another aspect of the invention relates to a composite containing a polyolefin and an inorganic material. The composite is prepared according to the process comprising the step of reacting (i) polymeric coupling agent with (ii) an inorganic material containing a polar group and capable of reacting with the polymeric coupling agent.

Suitable polymeric coupling agents and inorganic materials, as well as suitable coupling reaction conditions and reaction equipment are the same as those descriptions relating to the process as discussed in the above embodiments. The resulting composite depends upon the starting materials and reaction conditions used.

The inorganic material can contain multiple polar groups and hence multiple reactive sites. Accordingly, one or more modified polyolefin chains can be covalently bonded at one or more binding sites of the inorganic material.

As discussed above, the modified polyolefin can self-couple to form a self-coupled coupling agent containing one or more polymeric coupling agent chains. Thus, in the resulting composite, one or more reactive sites in the inorganic material can contain a long-chain branch that covalently links one or more modified polyolefin chains.

Accordingly, in certain embodiments, the resulting composite contains branched chains resulting from both the reaction of the polymeric coupling agent (i) with the inorganic material (ii), and the reaction of the modified polyolefin with itself.

EXAMPLES

The following examples are for illustrative purposes only and are not intended to limit, in any way, the scope of the present invention.

Example 1—VPN as a Polymeric Coupling Agent and Self-Coupling Reactions

Figure 2:
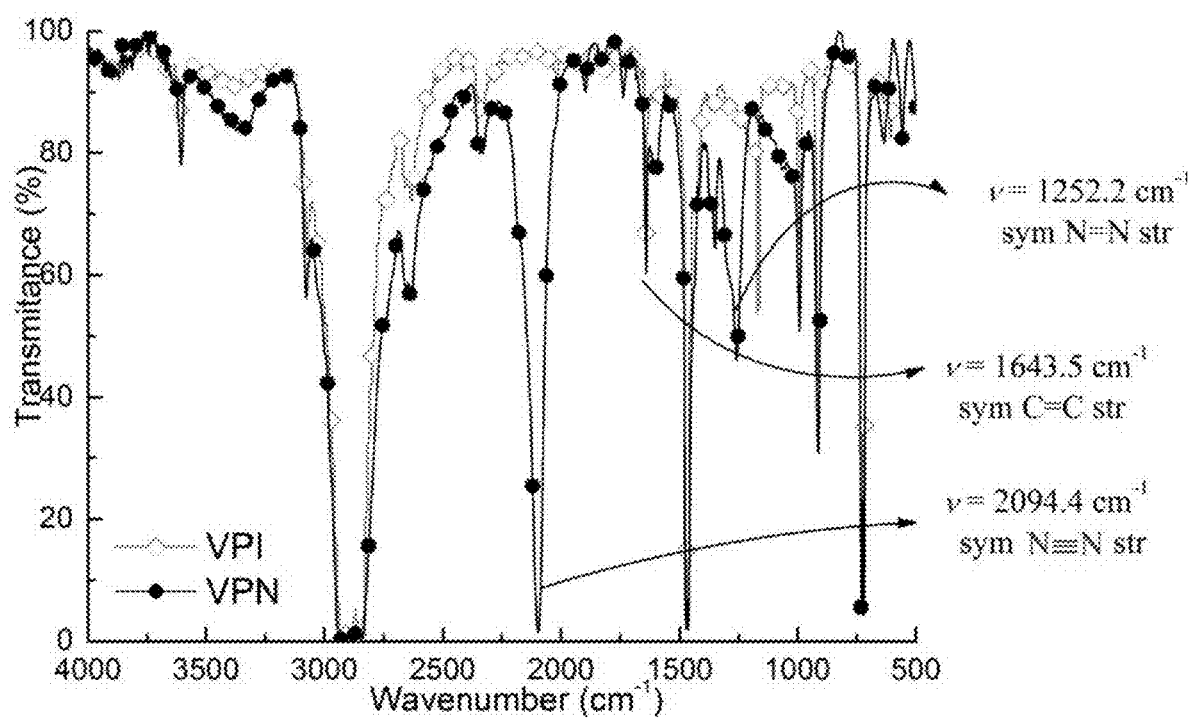
FIG. 2 shows the fourier transform infrared spectroscopy (FTIR) spectra of VPN and VPI.

VPN was prepared from VPI as the starting material and the reference material as a polymeric non-coupling agent. Because of the substitution reaction of the iodine group to the azide group, the two polymers have similar molecular weight, similar molecular weight distribution, with the same main chain. The two polymers differ only on the functional group at one end of the polymer chain, as showing in the $^1$H NMR spectra in FIG. 1. The presence of the azide group was also confirmed by FTIR as shown in FIG. 2.

Figure 5:
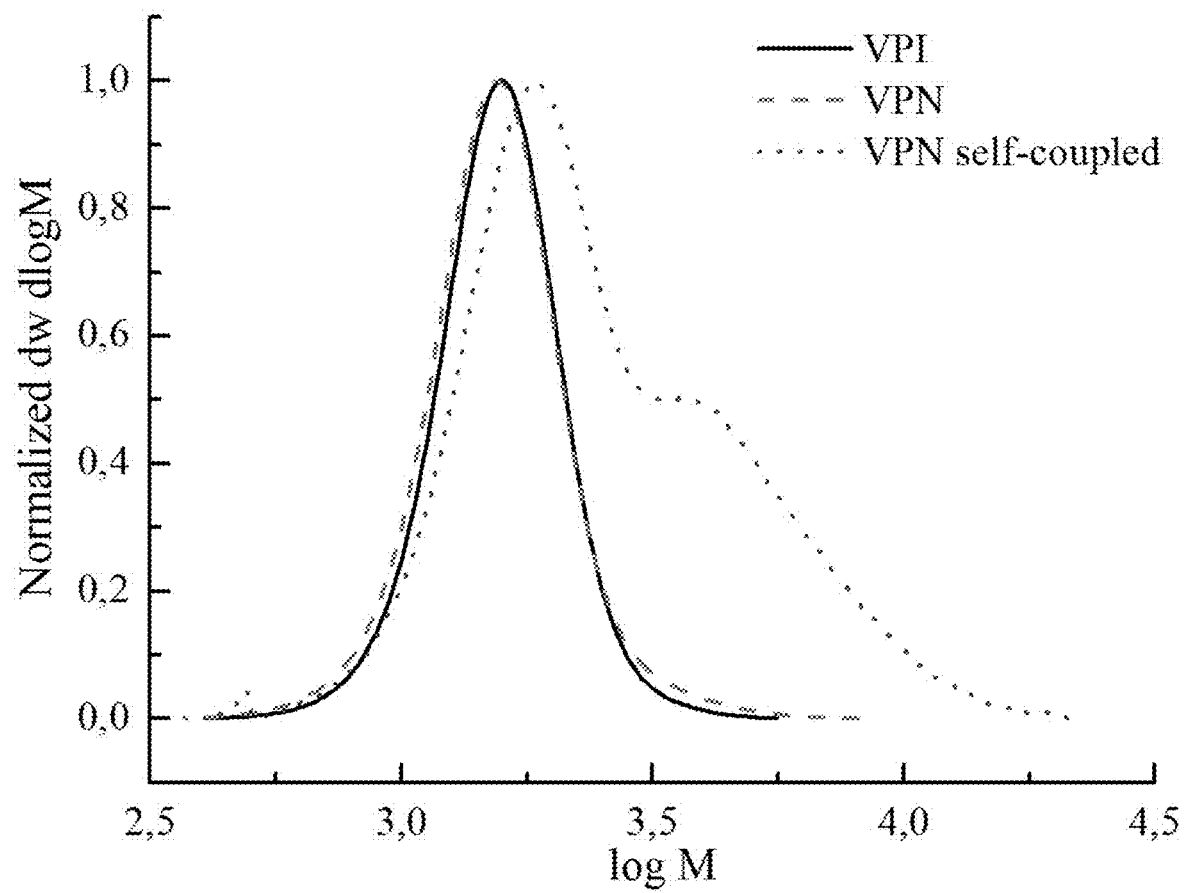
FIG. 5 shows the results of size-exclusion chromatography (SEC) measurements of VPI, VPN, and self-coupled VPN.

The molecular weights of the polymeric non-coupling agent (VPI) and the polymeric coupling agent (VPN) were estimated by size-exclusion chromatography (SEC), and the results displayed in FIG. 5 shows an analogous molecular weight (MW) and molecular weight distribution (MWD) between VPI and VPN.

Figure 3:
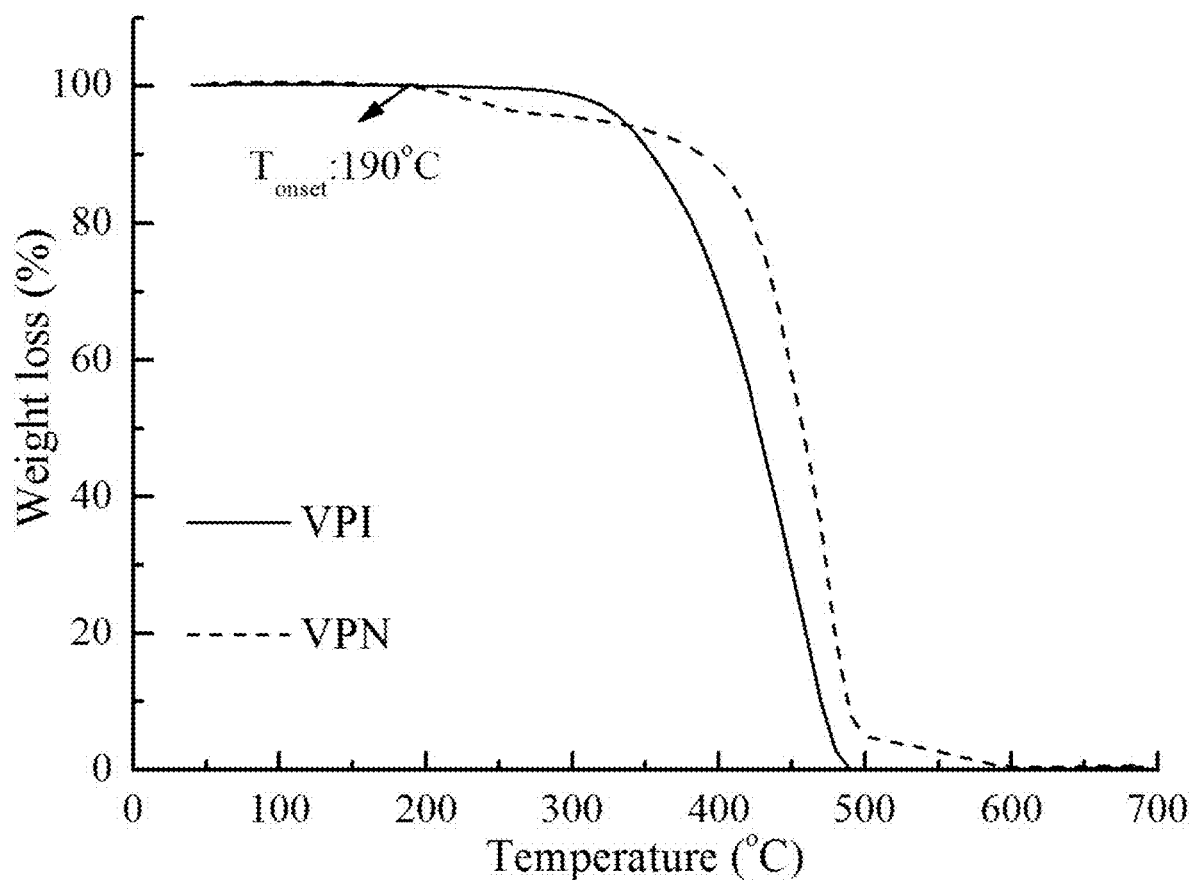
FIG. 3 is a graph showing the thermogravimetric analysis (TGA) thermograms of VPI and VPN.

As shown in FIG. 3, the thermogravimetric analysis (TGA) showed a first decomposition curve for the polymeric coupling agent VPN starting at approximately 190° C. of roughly 4 wt % of weight loss, which is assigned to the $N_2$ loss due to the formation of the nitrene radical, as represented in Scheme 1. Such behavior was not observed in a polymeric non-coupling agent such as VPI.

Figure 4:
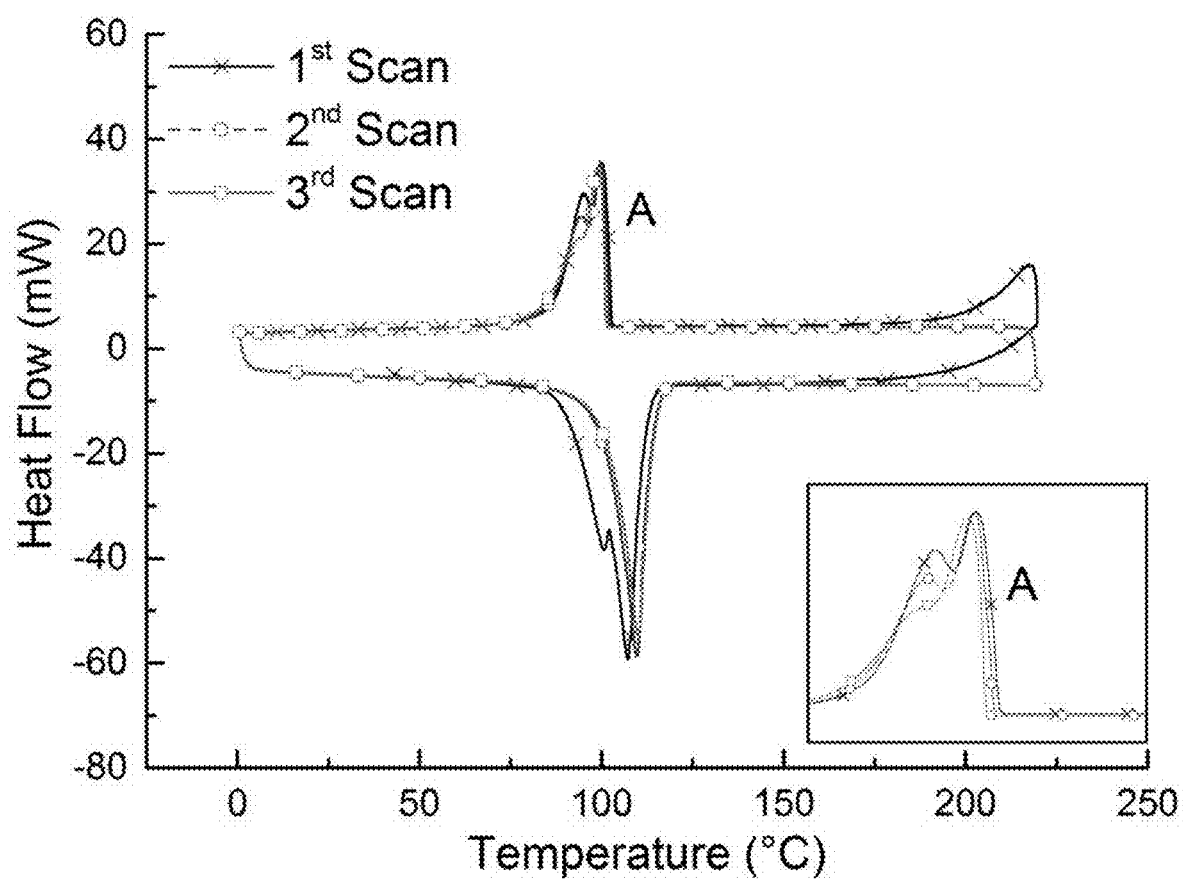
FIG. 4 is a graph showing the differential scanning calorimetry (DSC) thermograms of VPN.

In FIG. 4, the DSC thermograms show the presence of two distinct endotherm peaks in the VPN sample, suggesting the presence of different crystal sizes and lattice structures. The formation of the self-coupled material resulted in an increase of about 5° C. of the main crystallization temperature peak (at approximately 95° C. and 100° C., respectively; see a more clear view of the two peaks in the enlarged window A) and the sharpening of the endothermic peak after the second scan during the DSC analysis. Furthermore, during the first DSC scan, an exothermic curve was observed at approximately 170° C., which suggests the formation of nitrene species and a resulting self-coupling reaction.

In addition to the DSC analysis, the self-coupled VPN sample was characterized by SEC and compared with the VPI and VPN samples, as shown in FIG. 5. A formation of a high molecular weight shoulder was observed in the self-coupled VPN sample as a result of the self-coupling reaction between the coupling group (azide group) and the polymer main chain within the polymeric coupling agent VPN. This result converges with the results obtained by the thermal analysis, i.e., for the VPN sample, the TGA results showed that the first decomposition analysis showed a weight loss of approximately 4 wt % followed by an increase of the $T_{20}$% ($T_{20}$% corresponds to the temperature of 20% of weight loss) of approximately 43° C., as shown in Table 1, due to the increase of the molecular weight after the self-coupling reactions of the polymeric coupling agent VPN.

Figure 6:
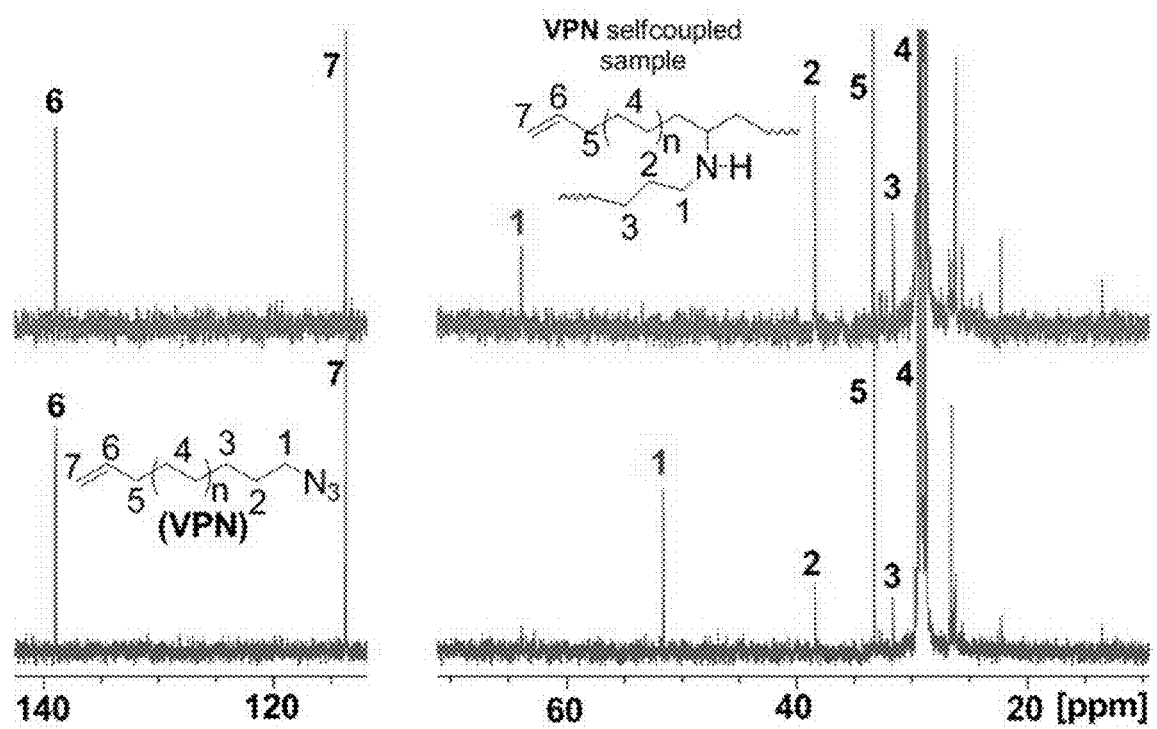
FIG. 6 shows the $^{13}$C NMR spectra of VPN and self-coupled VPN.

Other relevant information obtained from $^{13}$C NMR spectra, shown in FIG. 6, reveals that the vinyl group did not react after the polymeric coupling agent VPN sample was recovered from the DSC analysis. Furthermore, a down field shift was observed for C(1), suggesting an effective coupling insertion of the azide group into the polymer main chain. Therefore, the results show that the VPN sample may generate the nitrene species at temperature above 180-190° C. Additionally, it shows that the singlet nitrene will undergo to a coupling reaction with the C—H bonds of the polyethylene section of the polymeric coupling agent VPN, producing a high molecular weight self-coupled polymer, which may be grafted or hyperbranched.

TABLE 1

$T_{20\%}$ and $T_{onset}$ results for polymeric coupling agent and polymeric coupling agent blends in self-coupling reactions

| Polymeric Coupling Agent (PCA) | Molecular Coupling Agent (MCA) | Blend code | Ratio (PCA:MCA) | $T_{20\%}$ (° C.) | $T_{onset}$ (° C.) |
|---|---|---|---|---|---|
| VPN | NONE | N/A | N/A | 424.1 | 190 |
| VPN | 4,4'-oxybis(benzenesulfonyl azide) | B1 | 2:1 | N/A | N/A |
| VPN | 4,4'-oxybis(benzenesulfonyl azide) | B2 | 1:1 | 400.1 | 140 |
| VPN | Bis(tert-butylcyclohexyl) peroxydicarbonate | B3 | 10:1 | 488.4 | 140 |
| VPN | Bis(tert-butylcyclohexyl) peroxydicarbonate | B4 | 1:1 | N/A | N/A |

Example 2—Preparation of VPN and 4,4'-oxybis(benzenesulfonyl azide) as Polymeric/Molecular Coupling Agent Blend, Blend B1

After recovering the produced VPN (polymeric coupling agent), 41.3 g of the VPN sample was dispersed in 0.6 L of toluene at 40° C. and the mixture was stirred until the entire polymer sample is swollen. Then, a solution of 34.45 g of the molecular coupling agent 4,4'-oxybis(benzenesulfonyl azide): Pentaerythritol Tetrakis(3-(3,5-di-tert-butyl-4-hydroxyphenyl)propionate) (25:75 wt %) in 0.3 L of toluene was added to the system, which enabled to achieve a good dispersion. The resulting mixture was stirred for an additional 30 minutes at 40° C. and then cooled down to room temperature, and the solvent was recovered under reduced pressure to obtain a white solid. The white solid was dried under reduced pressure for approximately 6 hours and grinded to obtain a fine white powder of Blend B1 at a molar ratio of 2:1 polymeric coupling agent:molecular coupling agent.

Figure 7:
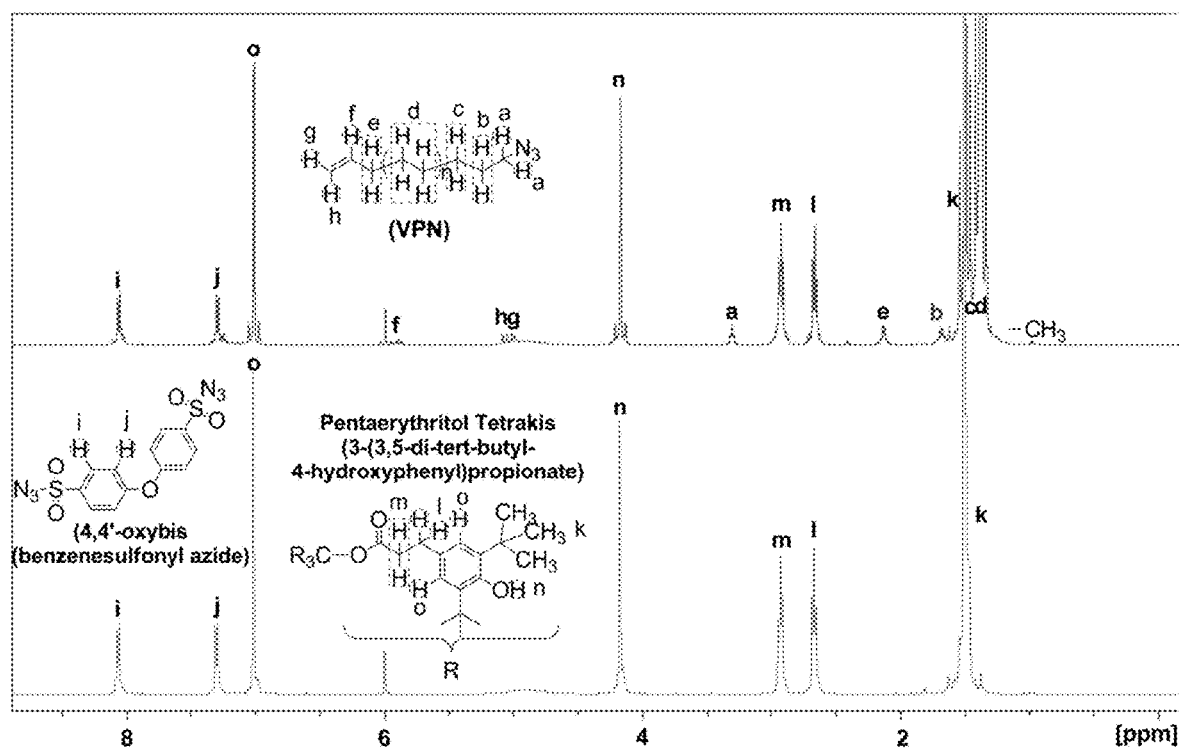
FIG. 7 shows the $^1$H NMR spectra comparing the results of the molecular coupling agent 4,4'-oxybis(benzenesulfonyl azide) (including the anti-oxidant, pentaerythritol tetrakis(3-(3,5-di-tert-butyl-4-hydroxyphenyl)propionate)) and the results of the polymeric coupling agent blend, Blend B1, prepared in Example 2.

FIG. 7 shows the $^1$H NMR spectra comparing the spectra of the molecular coupling agent 4,4'-oxybis(benzenesulfonyl azide) (including the presence of the anti-oxidant Pentaerythritol Tetrakis(3-(3,5-di-tert-butyl-4-hydroxyphenyl) propionate)) and the final Blend B1. It shows that the coupling agents were fully recovered and there was not observed a side reaction during the preparation of the blend. Scanning Electron Microscopy (SEM) results (not provided) show a uniform distribution of the produced blend.

Example 3—Preparation of VPN and 4,4'-Oxybis(Benzenesulfonyl Azide) as Polymeric/Molecular Coupling Agent Blend, Blend B2

Same procedure was used as described for Blend B1 in Example 2, except that the molar ratio of the polymeric coupling agent:molecular coupling agent was 1:1.

Example 4—Preparation of VPN and Bis(Tert-Butylcyclohexyl) Peroxydicarbonate as Polymeric/Molecular Coupling Agent Blend, Blend B3

Same procedure was used as described for Blend B1 in Example 2, except that the molar ratio of the polymeric coupling agent:molecular coupling agent was 10:1.

Example 5—Preparation of VPN and Bis(Tert-Butylcyclohexyl) Peroxydicarbonate as Polymeric/Molecular Coupling Agent Blend, Blend B4

Same procedure was used as described for Blend B1 in Example 2, except that the molecular coupling agent used was bis(tert-butylcyclohexyl) peroxydicarbonate, and the molar ratio of the polymeric coupling agent:molecular coupling agent was 1:1.

Example 6—Polymeric/Molecular Coupling Agent Blends and Self-Coupling Reactions

Figure 8:
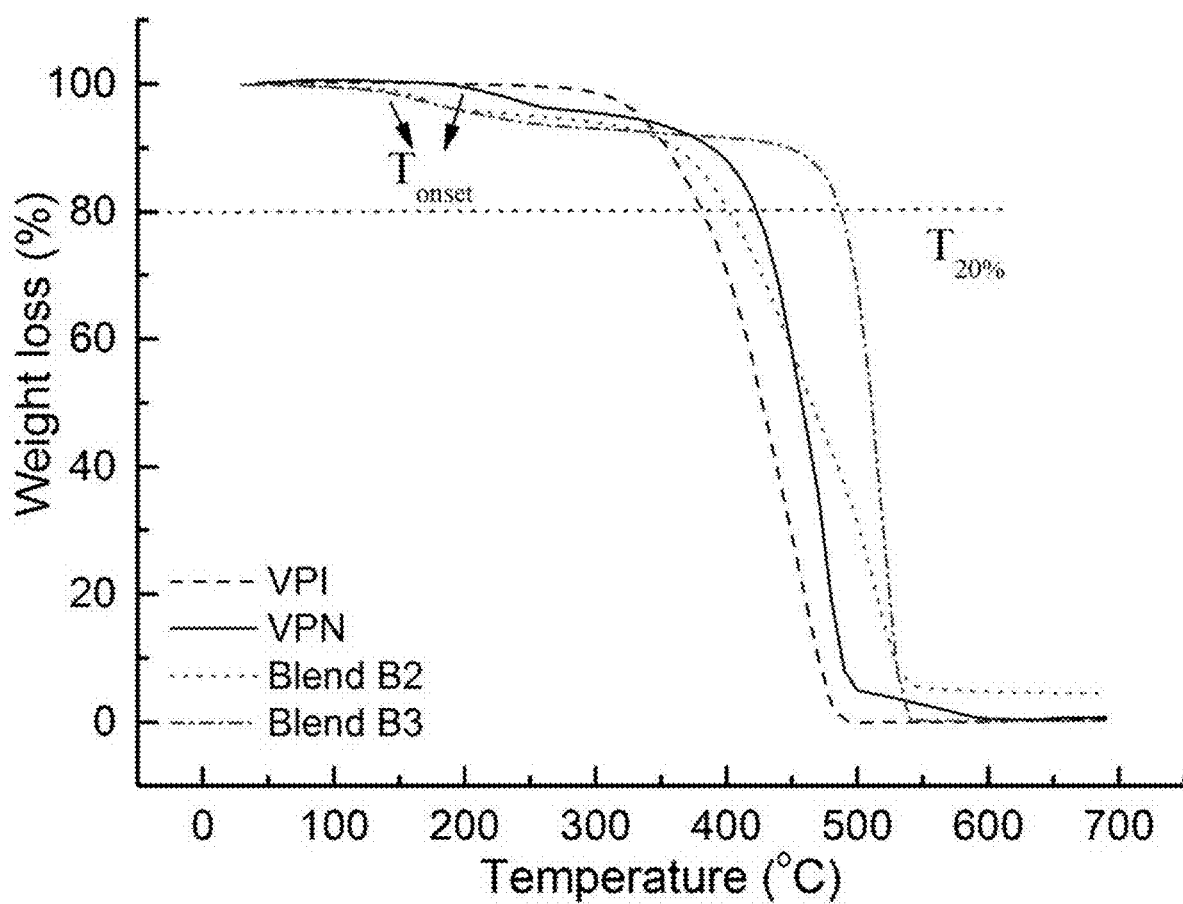
FIG. 8 shows the TGA thermograms comparing the $T_{onset}$ of VPI (reference), the polymeric coupling agent (VPN), and the polymeric coupling agent blends (B2 and B3).

As shown in FIG. 8, the decomposition analyses were carried out by TGA to compare the $T_{onset}$, which is assigned for the first decomposition of the azide group followed by the loss of nitrogen gas, of the polymeric non-coupling agent VPI (reference), the polymeric coupling agent (VPN), and the polymeric coupling agent blends (B2 and B3). The results showed a decrease of approximately 50° C. of the $T_{onset}$, suggesting that the presence of the molecular coupling agent promoted the decomposition of the azide group. An increase of $T_{20}$% compared to the reference was also observed, as a result of the increase of the molecular weight after the self-coupling reactions of the polymeric coupling agent and molecular coupling agent.

Example 7—Polymeric Coupling Agent and Homo-Polypropylene: Coupling Reaction (P1)

The coupling reaction between VPN and homo-polypropylene (HPP) of melt flow index of 2.0 dg/min was carried out in a Brabender mixer. In order to evaluate the shear and temperature effect on the integrity of the final polymer after the blending process, a reference sample of HPP was also processed in a Brabender mixer under the same conditions. For instance, 20 g of the HPP as a base resin was initially added to Brabender mixer and the temperature was kept at 240° C. under nitrogen flow for 45 seconds or until HPP was completely melted. The reaction was followed by the addition of 0.4 g of the polymeric coupling agent VPN (2.0 wt %) under the same conditions and the resulting mixture was reacted for an additional 120 seconds.

Figure 9:
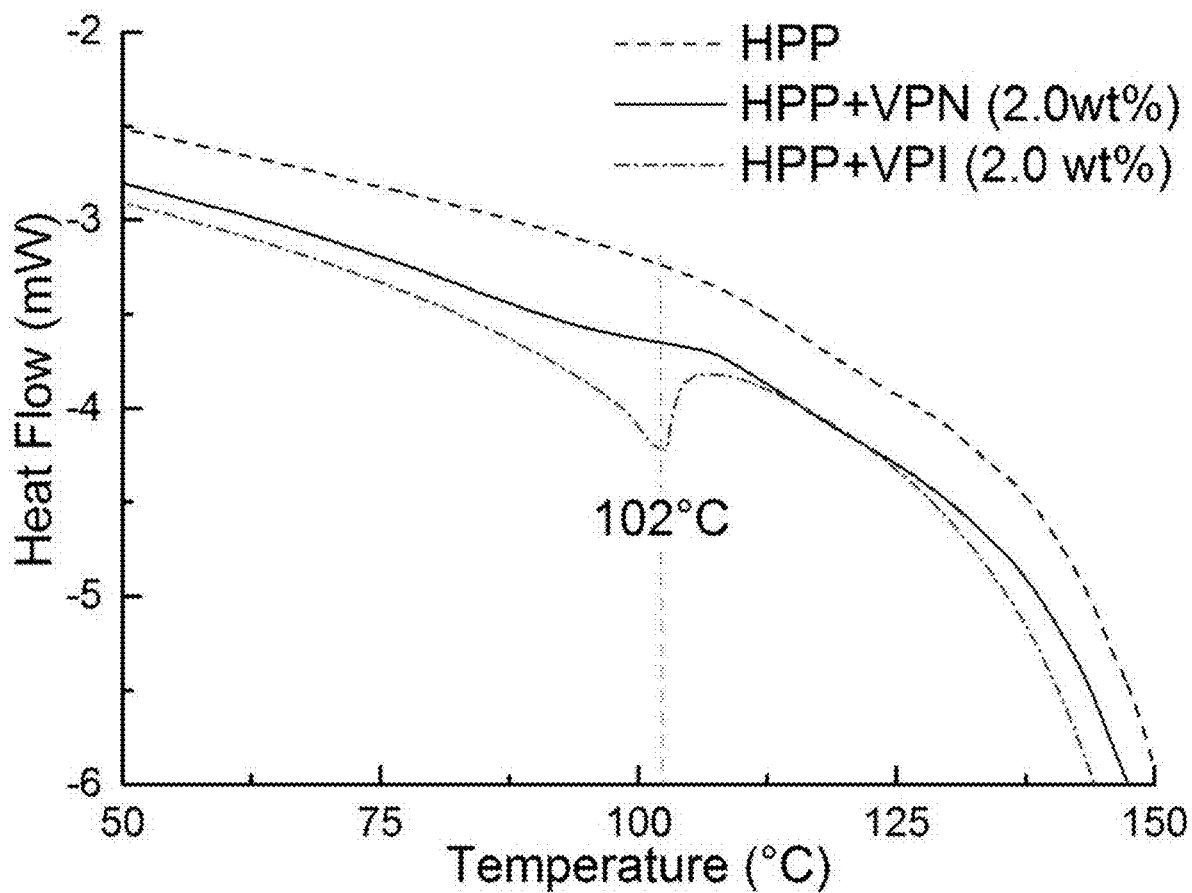
FIG. 9 shows the DSC thermogram comparing the thermal behavior of various final polypropylene resins prepared from mixing homo-polypropylene (HPP) with VPI and VPN against the reference sample of HPP.

As a result of an efficient coupling reaction between VPN and HPP, an endothermic peak corresponding to the VPN at approximately 105° C. was not detected, as shown in FIG. 9. On the other hand, when a non-coupling agent such as VPI was blended with HPP under the same conditions, an endothermic peak at 102° C. was noticeable. This result was the first indication of the effective reaction between the polymeric coupling agent VPN and the HPP.

Figure 10:
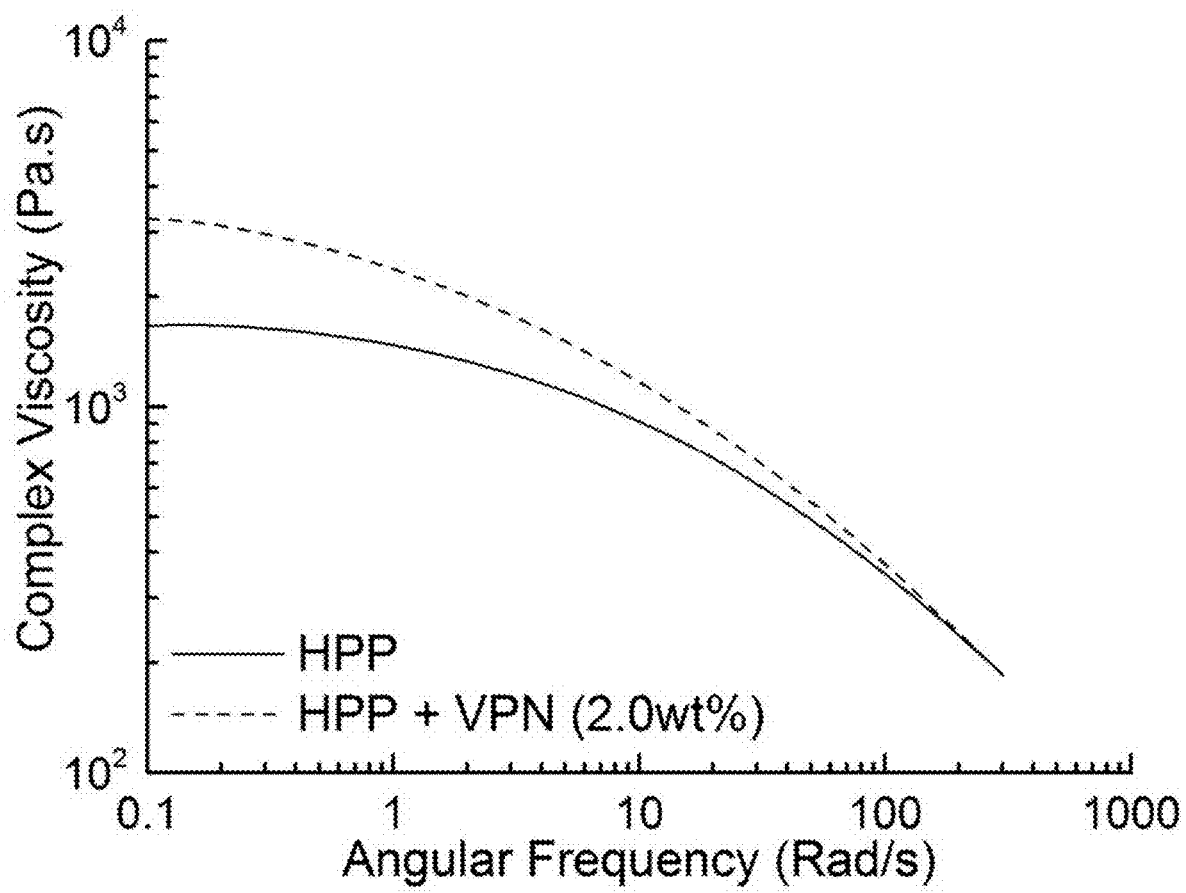
FIG. 10 shows the rheology data comparing the complex viscosity values of the final polypropylene resins prepared from mixing homo-polypropylene (HPP) with VPN against the reference sample of HPP.
Figure 11:
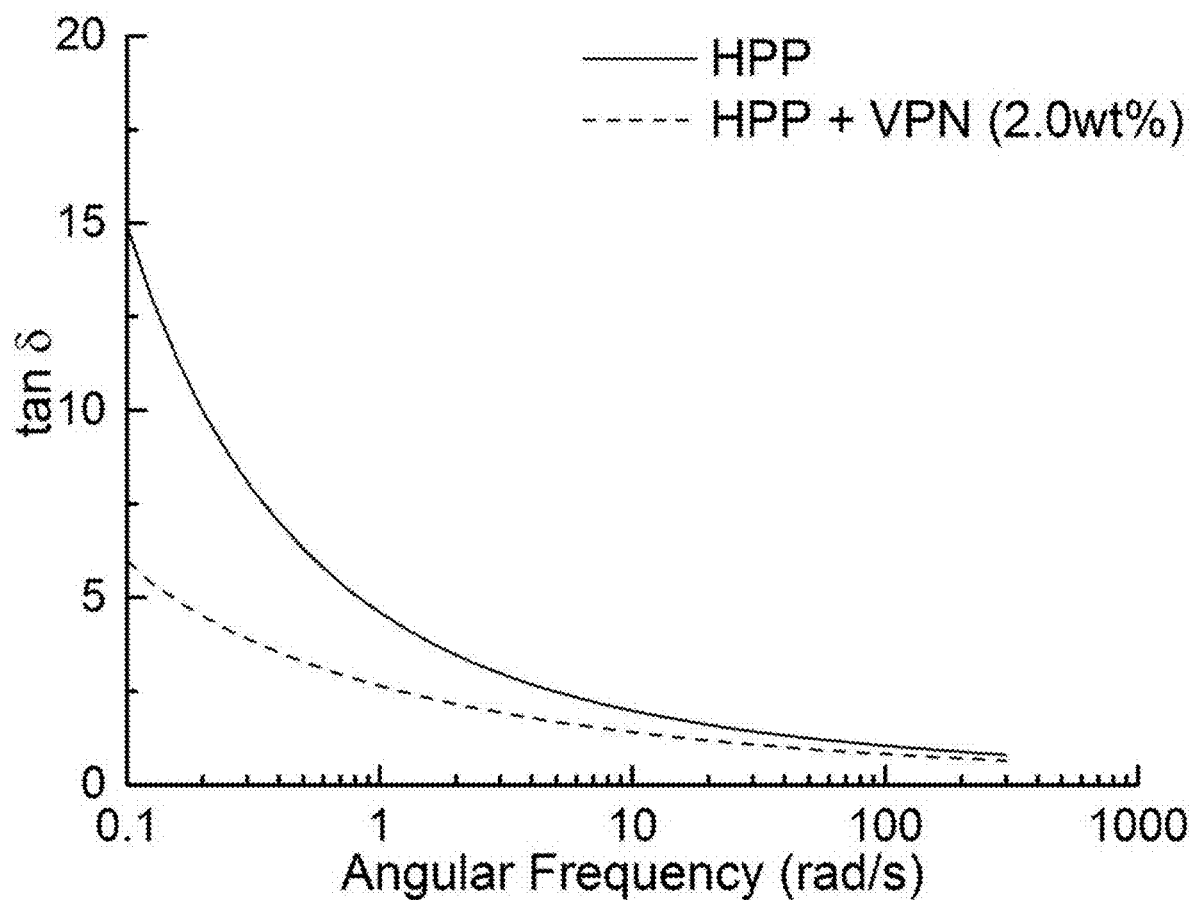
FIG. 11 shows the rheology data comparing the tan δ values of the final polypropylene resins prepared from mixing homo-polypropylene (HPP) with VPN against the reference sample of HPP.

Furthermore, the rheology data shown in FIGS. 10 and 11 also support the modification of the HPP sample by the VPN under the condition described above. FIG. 10 shows an increase of the complex viscosity and a steeper curve over the HPP sample, indicating a higher degree of entanglement of the chain after the reaction between VPN and HPP, suggesting a viscoelastic behavior of the HPP+VPN sample. This was also confirmed in FIG. 11, as the tan δ values of the HPP+VPN sample are lower than the HPP sample, showing a longer relaxation of the sample specially at a lower angular frequency.

Example 8—Polymeric Coupling Agent and Homo-Polypropylene: Coupling Reaction (P2)

The coupling reaction between VPN and homo-polypropylene (HPP) of melt flow of 2.0 dg/min was carried out in a Brabender mixer. In this experiment, 20 g of HPP and 1.0 g of the polymeric coupling agent VPN (5.0 wt %) were added together to the Brabender mixer at 240° C. The reaction was kept under nitrogen and several samples were collected between 30 seconds and 180 seconds. In order to evaluate the shear and temperature effect on the integrity of the final polymer after the blending process, a reference sample of HPP was also processed in a Brabender mixer under the same conditions, and the samples of the HPP were also collected between 30 seconds and 180 seconds.

Figure 12:
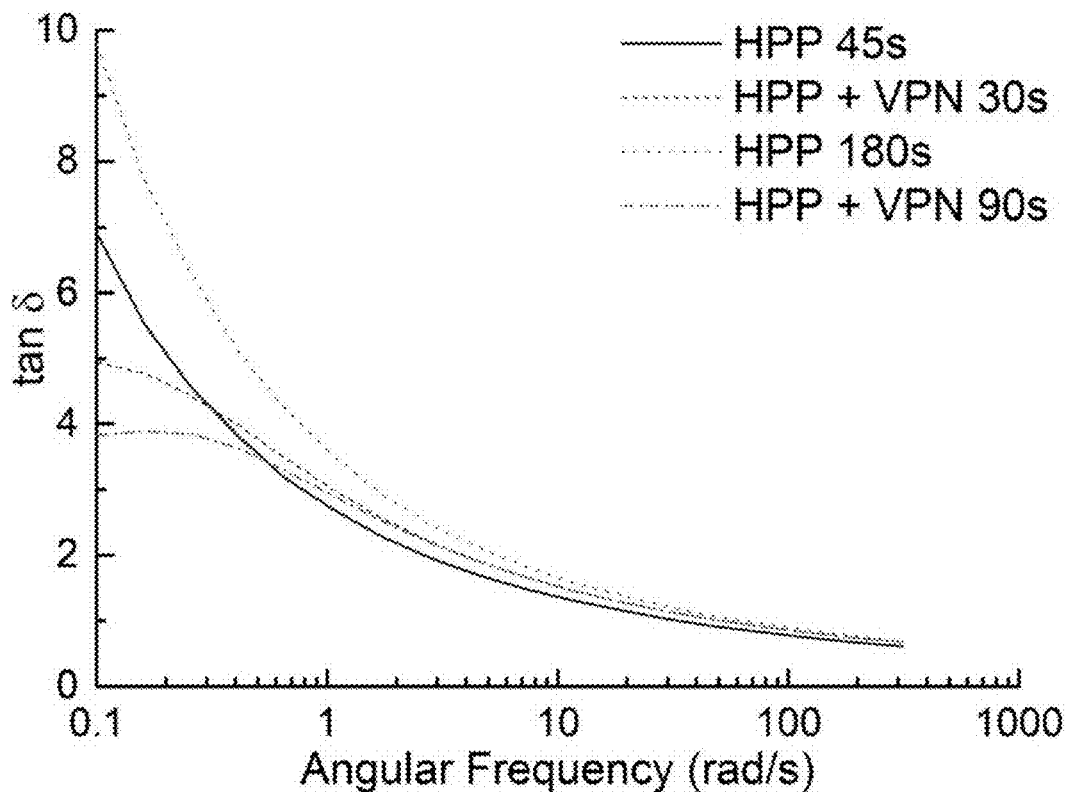
FIG. 12 shows the rheology data comparing the tan δ values of the final polypropylene resins prepared from mixing homo-polypropylene (HPP) with VPN at reaction time between 30 seconds and 180 seconds, against the reference sample of HPP under similar conditions.

The results from dynamic shear measurement are shown in FIG. 12. The HPP+VPN sample started to form a plateau at a lower angular frequency which was more pronounced at a longer reaction time. It is a clear evidence of stronger entanglements of the resulting polymer chains after the incorporation of the VPN sample. On the other hand, no shear recovery was observed on the HPP samples showing an enhanced degradation on the sample kept collected even after 180 seconds.

Example 9—Polymeric/Molecular Coupling Agent Blends and Homo-Polypropylene: Residual Azide (P3)

Figure 13:
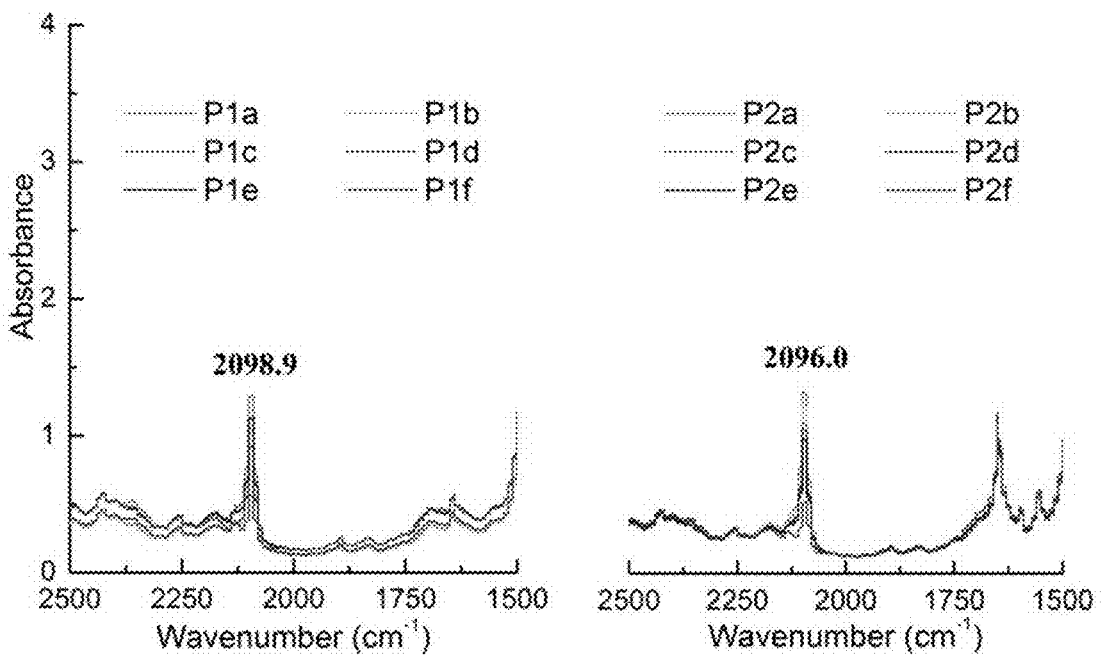
FIG. 13 shows the FTIR spectra of the final polypropylene resins prepared from the coupling reaction between HPP and polymeric coupling agent VPN based on the reaction conditions in P1 or P2 described in Examples 7 and 8, collected at approximately 45 seconds (P1a & P2a), 100 seconds (P1b & P2b), 180 seconds (P1c & P2c), 240 seconds (P1d & P2d), 360 seconds (P1e & P2e), and 420 seconds (P1f & P2f), respectively.

The coupling reaction between a homo-polypropylene (HPP) of melt flow of 2.0 dg/min was carried out with the polymeric coupling agent at the conditions described in Examples 7 and 8. The polymer product showed the presence of residual azide groups, which were detected by FTIR as shown in FIG. 13. The samples were collected at approximately 45 seconds (P1a & P2a), 100 seconds (P1b & P2b), 180 seconds (P1c & P2c), 240 seconds (P1d & P2d), 360 seconds (P1e & P2e), and 420 seconds (P1f & P2f), respectively. These results demonstrate that even after 420 seconds of reaction, it was possible to observe the symmetric stretching vibration band between 2092 and 2098 cm$^{-1}$ assigned to the N≡N, suggesting the presence of unreacted azide groups in the final product.

Figure 14:
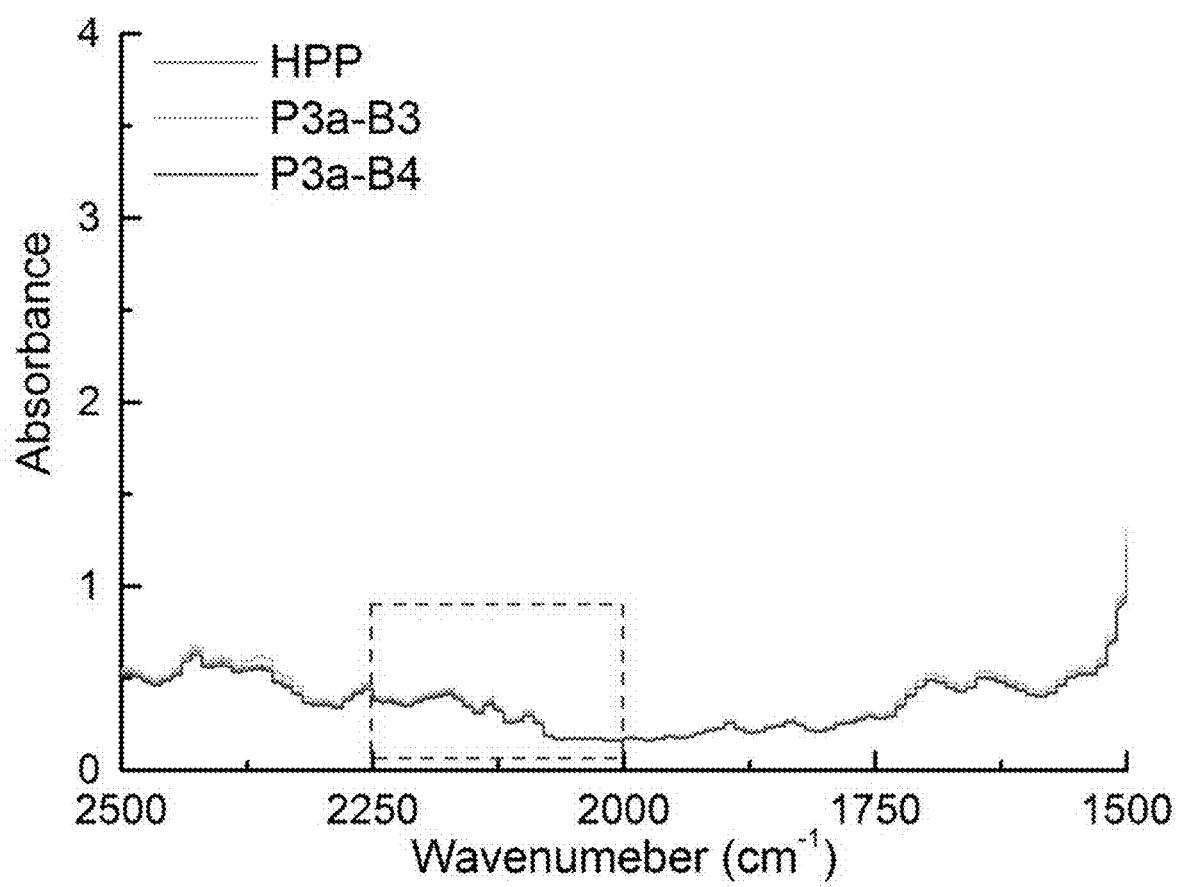
FIG. 14 shows the FTIP spectra of the final polypropylene resins prepared from the coupling reaction between HPP and polymeric coupling agent blend B3 and B4 based on the reaction conditions in P3 described in Example 9, collected at approximately 45 seconds (P3a-B3 and P3a-B4).

In a different approach, the presence of molecular coupling agents in the blends with the polymeric coupling agent appeared to trigger the formation of the nitrene species in a shorter reaction time. Thus, a coupling reaction was carried out between a HPP of melt flow of 2.0 dg/min and a polymeric coupling agent blend B3 and B4 under the conditions described in Example 8. The product of the reaction was collected after 45 seconds for samples P3a-B3 and P3a-B4 and the N≡N symmetric stretching vibration band was not detected by FTIR, as shown in FIG. 14.

What is claimed is:

1. A polymeric coupling agent comprising:
   a polymer prepared from at least one olefin monomer or derivative thereof containing 5 to 20 carbon atoms, and
   one or more reactive coupling groups covalently bonded to one or more terminal ends of the polymer chain and/or one or more repeating units of the polymer, optionally via one or more linking moieties,
   wherein the olefin monomer or derivative thereof is a norbornene-based bridged, cyclic olefin monomer, and
   wherein the reactive coupling group is selected from the group consisting of a sulfonyl azide, aryl azide, phosphoryl azide, acyl azide, formyl azide, and combinations thereof.

2. The polymeric coupling agent of claim 1, wherein the reactive coupling groups are covalently bonded to one or more repeating units of the polymer as pendent groups.

3. The polymeric coupling agent of claim 1, wherein the polymer is a copolymer further comprising one or more olefin comonomers containing 2 to 20 carbon atoms.

4. The polymeric coupling agent of claim 1, wherein the reactive coupling group is sulfonyl azide.

5. The polymeric coupling agent of claim 1, wherein the linking moiety is present and selected from a group consisting of —O—, aryl, alkyl, acyl, sulfonyl, sulfonate ester, sulfonamide, phosphate ester, carboxylate ester, amine, amide, and combinations thereof.

6. The polymeric coupling agent of claim 1, wherein the linking moiety is —C$_6$H$_4$— and the reactive coupling group is a sulfonyl azide.

7. The polymeric coupling agent of claim 1, wherein the polymer comprises one or more of the following repeating unit of formula (I):

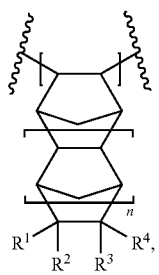

(I)

wherein:
R$^1$, R$^2$, R$^3$, and R$^4$ are each independently selected from the group consisting of hydrogen; halogen; —OR$^5$; —C(O)OR$^5$; —OC(O)R$^5$; —NR$^5$R$^6$; —ONR$^5$R$^6$; —N(R$^5$)OR$^6$; —SR$^5$; —C(S)SR$^5$; —SC(S)R$^5$; —SC(S)NR$^5$R$^6$; —SC(O)SR$^5$; —SC(S)SR$^5$; —OSiR$^5$R$^6$R$^7$; —C≡C—R$^5$; epoxide; peroxide; alkyl borane; isocyanate; silanes; a hydrocarbyl or halohydrocarbyl group selected from the group consisting of linear or branched C$_1$-C$_{16}$ alkyl, perfluoroalkyl, C$_3$-C$_{12}$ cycloalkyl, C$_6$-C$_{12}$bicycloalkyl, C$_7$-C$_{14}$ tricycloalkyl, aryl, arylalkyl, perfluoroaryl, and perfluoroarylalkyl; —NH—Y$_1$—R$^8$—Y$_2$—N$_3$; and —X-aryl-SO$_2$N$_3$;
Y$_1$ and Y$_2$ are each independently absent,

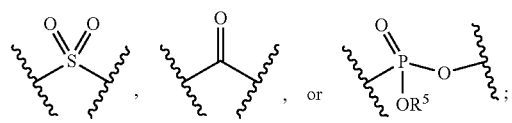

X is selected from the group consisting of: alkyl, aryl, ether, —NH—, —NHSO$_2$—, —O—, —CO, —C(O)O, —OC(O), —OC(O)O—, —S, —(CR$^5$R$^6$)$_a$—, —O(CR$^5$R$^6$)$_a$—, —(CR$^5$R$^6$)$_a$O—, —(CR$^5$R$^6$)$_a$O(SiR$^5$R$^6$)$_a$—, —(CR$^5$R$^6$)$_a$O(CR$^5$R$^6$)$_a$—, —C(O)(CR$^5$R$^6$)$_a$—, —(SiR$^5$R$^6$)$_a$O(SiR$^5$R$^6$)$_a$—, —(CR$^5$R$^6$)$_a$C(O)—, —C(O)O(CR$^5$R$^6$)$_a$—, —(CR$^5$R$^6$)$_a$C(O)O—, —OC(O)(CR$^5$R$^6$)$_a$—, —(CR$^5$R$^6$)$_a$OC(O)—, —(CR$^5$R$^6$)$_a$OC(O)$_a$—, —(CR$^5$R$^6$)$_a$OC(O)O(CR$^5$R$^6$)$_a$—, —OC(O)O(CR$^5$R$^6$)$_a$—, —S(CR$^5$R$^6$)$_a$—, —(CR$^5$R$^6$)$_a$S—, —(SiR$^5$R$^6$)$_a$—, —O(SiR$^5$R$^6$)$_a$—, and —(SiR$^5$R$^6$)$_a$O—;
R$^5$, R$^6$, and R$^7$ are each independently hydrogen, linear or branched C$_1$-C$_{12}$ alkyl, or aryl;
R$^8$ is absent, aryl, alkyl, or diarylether;
a is an integer from 0 to 12; and
n is 0, 1, or 2.

8. The polymeric coupling agent of claim 7, wherein at least one of R$^1$, R$^2$, R$^3$, and R$^4$ is —NH—Y$_1$—R$^7$—Y$_2$—N$_3$ or —X-aryl-SO$_2$N$_3$.

9. The polymeric coupling agent of claim 7, wherein the polymer comprises two or more different repeating units of formula (I).

10. The polymeric coupling agent of claim 9, wherein at least one of R$^1$, R$^2$, R$^3$, and R$^4$ in one of the repeating units of formula (I) is —NH—Y$_1$—R$^7$—Y$_2$—N$_3$ or —X-aryl-SO$_2$N$_3$.

11. The polymeric coupling agent of claim 1, wherein the polymer is a copolymer comprising one or more repeating units of

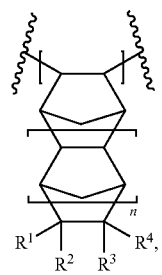

and one or more of the following repeating units:

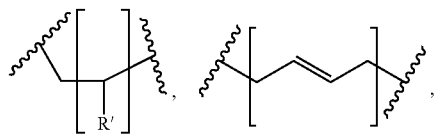

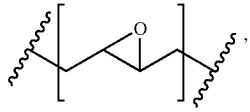

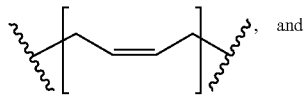, and

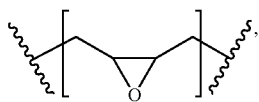

wherein:

R' is H, alkyl, vinyl, aryl, —C(O)R", —CN;

R" is H, —OH, or alkoxy, NH$_2$;

R$^1$, R$^2$, R$^3$, and R$^4$ are each independently selected from the group consisting of hydrogen; halogen; —OR$^5$; —C(O)OR$^5$; —OC(O)R$^5$; —NR$^5$R$^6$; —ONR$^5$R$^6$; —N(R$^5$)OR$^6$; —SR$^5$; —C(S)SR$^5$; —SC(S)R$^5$; —SC(S)NR$^5$R$^6$; —SC(O)SR$^5$; —SC(S)SR$^5$; —OSiR$^5$R$^6$R$^7$; —C≡C—R$^5$; epoxide; peroxide; alkyl borane; isocyanate; silanes; a hydrocarbyl or halohydrocarbyl group selected from the group consisting of linear or branched C$_1$-C$_{16}$ alkyl, perfluoroalkyl, C$_3$-C$_{12}$ cycloalkyl, C$_6$-C$_{12}$bicycloalkyl, C$_7$-C$_{14}$ tricycloalkyl, aryl, arylalkyl, perfluoroaryl, and perfluoroarylalkyl; —NH—Y$_1$—R$^8$—Y$_2$—N$_3$; and —X-aryl-SO$_2$N$_3$;

Y$_1$ and Y$_2$ are each independently absent,

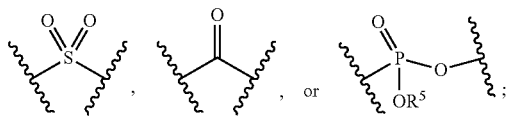

X is selected from the group consisting of: alkyl, aryl, ether, —NH—, —NHSO$_2$—, —O—, —CO—, —C(O)O—, —OC(O)—, —OC(O)O—, —S—, —O—, —CO—, —C(O)O—, —OC(O)—, —OC(O)O—, —S—, —(CR$^5$R$^6$)$_a$—, —O(CR$^5$R$^6$)$_a$—, —(CR$^5$R$^6$)$_a$O—, (CR$^5$R$^6$)$_a$O(SiR$^5$R$^6$)$_a$—, —(CR$^5$R$^6$)$_a$O(CR$^5$R$^6$)$_a$—, —C(O)(CR$^5$R$^6$)$_a$—, —(SiR$^5$R$^6$)$_a$O(SiR$^5$R$^6$)$_a$—, —(CR$^5$R$^6$)$_a$C(O)—, —C(O)O(CR$^5$R$^6$)$_a$—, —(CR$^5$R$^6$)$_a$C(O)O—, —OC(O)(CR$^5$R$^6$)$_a$—, (CR$^5$R$^6$)$_a$OC(O), —(CR$^5$R$^6$)$_a$OC(O)$_a$—, —(CR$^5$R$^6$)$_a$OC(O)O(CR$^5$R$^6$)$_a$—, —OC(O)O(CR$^5$R$^6$)$_a$—, —S(CR$^5$R$^6$)$_a$—, —(CR$^5$R$^6$)$_a$S—, —(SiR$^5$R$^6$)$_a$—, —O(SiR$^5$R$^6$)$_a$—, and —(SiR$^5$R$^6$)$_a$O—;

R$^5$, R$^6$, and R$^7$ are each independently hydrogen, linear or branched C$_1$-C$_{12}$ alkyl, or aryl;

R$^8$ is absent, aryl, alkyl, or diarylether;

a is an integer from 0 to 12; and n is 0, 1, or 2.

12. The polymeric coupling agent of claim 11, having one of the following structures:

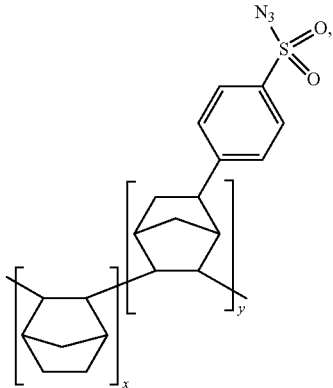

wherein x+y ranges from 1 to 1,000;

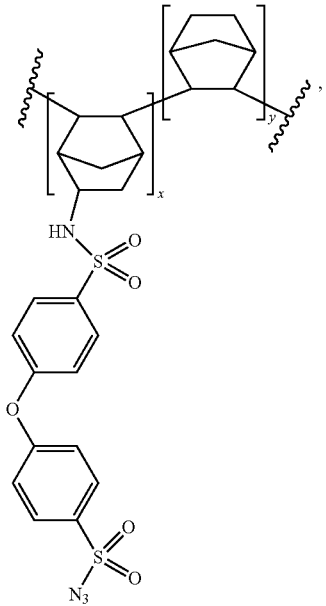

wherein x+y ranges from 1 to 1,000; or

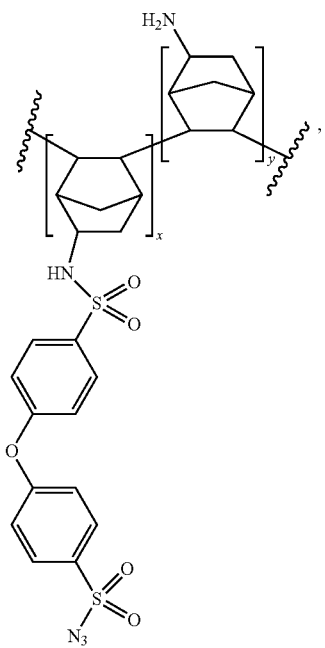

wherein x+y ranges from 1 to 1,000.

13. The polymeric coupling agent of claim 1, wherein the polymer has a number average molecular weight of less than 100,000 g/mol.

14. The polymeric coupling agent of claim 1, wherein the polymer has a molecular weight distribution ranging from about 1.0 to about 10.0.

15. The polymeric coupling agent of claim 3, wherein the olefin comonomer is isoprene.

16. The polymeric coupling agent of claim 3, wherein the olefin comonomer is styrene.

17. The polymeric coupling agent of claim 11, wherein one or more of the repeating units is

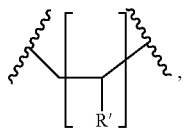

and R' is phenyl.

18. The polymeric coupling agent of claim 3, wherein the olefin comonomer is selected from the group consisting of ethylene; propylene; 1-butene; 2-butene; 1,3-butadiene; isoprene; 1-pentene; 1,3-pentadiene; 1,4-pentadiene; 3-methyl-1-butene; 3-methyl-1,4-pentadiene; 3,3-dimethyl-1,4-pentadiene; 1-hexene; 1,3-hexadiene; 1,4-hexadiene; 1,5-hexadiene; 4-methyl-1-pentene; 3-methyl-1-pentene; 3-methyl-1,5-hexadiene; 3,4-dimethyl-1,5-hexadiene; 4,6-dimethyl-1-heptene; 1,3-heptadiene; 1,4-heptadiene; 1,5-heptadiene; 1,6-heptadiene; 1-octene; 1,3-octadiene; 1,4-octadiene; 1,5-octadiene; 1,6-octadiene; 1,7-octadiene; 1-decene; 1-undecene; 1-dodecene; 1-tetradecene; 1-hexadecene; 1-octadecene; 1-eicocene; and combinations thereof.

19. The polymeric coupling agent of claim 7, wherein n is 0.

20. The polymeric coupling agent of claim 11, wherein n is 0.

21. A process for preparing a polymeric coupling agent of claim 7, comprising:
providing an aryl-containing norbornene-based polymer;
reacting the aryl-containing norbornene-based polymer with a sulfonating agent to form a sulfonyl aryl-containing norbornene-based polymer; and
reacting the sulfonyl aryl-containing norbornene-based polymer with an alkali metal azide to form an azide-modified polymeric coupling agent,
wherein the norbornene-based polymer is a polymer comprising one or more repeating units of:

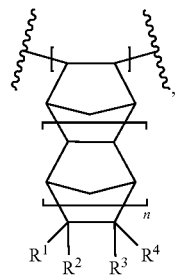

wherein:
$R^1$, $R^2$, $R^3$, and $R^4$ are each independently selected from the group consisting of hydrogren; halogen; $-OR^4$; $-C(O)OR^5$; $-OC(O)R^5$; $-NR^5R^6$; $-ONR^5R^6$; $-N(R^5)OR^6$; $-SR^5$; $-C(S)SR^5$; $-SC(S)R^5$; $-SC(S)NR^5R^6$; $-SC(O)SR^5$; $-SC(S)SR^5$; $-OSiR^5R^6R^7$; $-C\equiv C-R^5$; epoxide; peroxide; alkyl borane; isocyanate; silanes; a hydrocarbyl or halohydrocarbyl group selected from the group consisting of linear or branched $C_1-C_{16}$ alkyl, perfluoroalkyl, $C_3-C_{12}$ cycloalkyl, $C_6-C_{12}$ bicycloalkyl, $C_7-C_{14}$ tricycloalkyl, aryl, arylalkyl, perfluoroaryl, and perfluoroarylalkyl; $-NH-Y_1-R^8-Y_2-N_3$; and $-X-aryl-SO_2N_3$;
$Y_1$ and $Y_2$ are each independently absent,

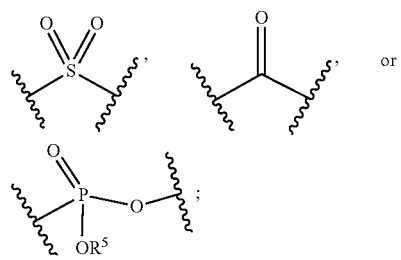

X is sleected from the group consisting of alkyl, aryl, ether, $-NH-$, $-NHSO_2-$, $-O-$, $-CO$, $-C(O)O-$, $-OC(O)$, $-OC(O)O-$, $-S$, $-(CR^5R^6)_a-$, $-O(CR^5R^6)_a-$, $-CR^5R^6)_aO-$, $-(CR^5R^6)_aO(SiR^5R^6)_a-$, $-(CR^5R^6)_aO(CR^5R^6)_a-$, $-C(O)(CR^5R^6)_a-$, $_{-(SiR}{}^5R^6)_aO(SiR^5R^6)_a-$, $-(CR^5R^6)_aC(O)-$, $-C(O)O(CR^5R^6)_a-$, $-(CR^5R^6)_aC(O)O-$, $-OC(O)(CR^5R^6)_a-$, $-(CR^5R^{R6})_aOC(O)-$, $-(CR^5R^6)_aOC(O)_a-$, $-(CR^5R^6)_aOC(O)O(CR^5R^5)_a-$, $-OC(O)O(CR^5R^6)_a-$, $-S(CR^5R^6)_a-$, $-(CR^5R^6)_aS-$, $-(SiR^5R^6)_a-$, $-O(SiR^5R^6)_a-$, and $-(SiR^5R^6)_aO-$;
$R^5$, $R^6$, and $R^7$ are each independently hydrogen, linear or branched $C_1-C_{12}$ alkyl, or aryl;
$R^8$ is absent, aryl, alkyl, or diarylether;

a is an integer from 0 to 12; and
n is 0, 1, or 2.

22. The process of claim 21, wherein the norbornene-based polymer is polynorbornene.

23. The process of claim 21, wherein the aryl-containing norbornene-based polymer is an aryl-terminated norbornene-based polymer.

24. The process of claim 23, wherein the aryl-terminated norbornene-based polymer is provided by
polymerizing a norbornene-based monomer, optionally with one or more comonomers, by solution-free radical polymerization, in the presence of an initiator that provides an aryl functional fragment and a solvent that does not act as a chain transfer agent, to form an aryl-terminated norbornene-based polymer.

25. The process of claim 24, wherein the initiator is selected from the group consisting of azobenzene, azocumene, and dibenzoyl peroxide.

26. The process of claim 24, wherein the initiator has the formula of:

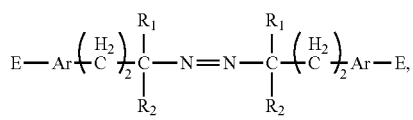

wherein:
n is an integer of 0-6;
$R_1$ and $R_2$ are each independently an alkyl, aryl, cyano, or carboxyl;
each Ar independently represents an aryl group containing 6-16 carbon atoms; and
E is H or

27. The process of claim 26, wherein the initiator has the formula of

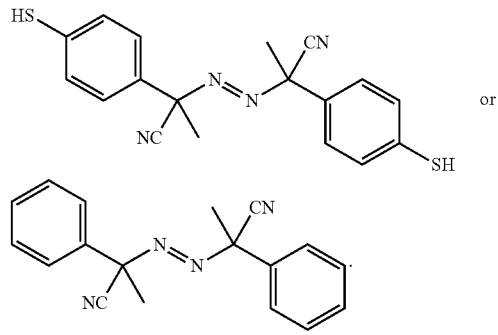

28. The process of claim 21, wherein the aryl-containing norbornene-based polymer is an aryl-pendent norbornene-based copolymer comprising repeating units of one or more norbornene-based monomers and repeating units of one or more of

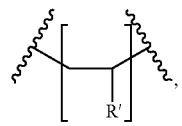

wherein R' is aryl.

29. The process of claim 21, wherein the solvent is selected from the group consisting of t-butanol, methanol, ethanol, acetone, methyl ethyl ketone, 2-pentanone, 3-pentanone, and methyl isobutyl ketone.

30. The process of claim 21, wherein the sulfonating agent is chlorosulfonic acid.

31. The process of claim 21, wherein the sulfonating agent is sulfuric acid, and wherein after forming the sulfonyl aryl-containing norbornene-based polymer and prior to reacting with an alkali metal azide, the sulfonyl aryl-containing norbornene-based polymer is further reacted with a chlorinating agent.

32. The process of claim 31, wherein the chlorinating agent is thionyl chloride.

33. The process of claim 21, wherein the alkali metal azide is sodium azide.

* * * * *

UNITED STATES PATENT AND TRADEMARK OFFICE
CERTIFICATE OF CORRECTION

PATENT NO. : 10,829,570 B2
APPLICATION NO. : 15/953247
DATED : November 10, 2020
INVENTOR(S) : Chip Few et al.

It is certified that error appears in the above-identified patent and that said Letters Patent is hereby corrected as shown below:

In the Claims

Column 37, Lines 57-58, Claim 11:
"- $(CR^5R^6),O(CR^5R^5)_a$-," should be "-$(CR^5R^6)_aO(CR^5R^6)_a$-,"

Column 37, Line 62, Claim 11:
"$(CR^5R^6)aOC(0)$," should be "$(CR^5R^6)_aOC(O)$,".

Column 40, Line 28, Claim 21:
"-$OR^4$;" should be "-$OR^5$;"

Column 40, Line 56, Claim 21:
"-$CR^5R^6)_aO$-," should be "-$(CR^5R^6)_aO$-,"

Column 40, Line 58, Claim 21:
"-$(_{Si}R^5R^6)_aO(SiR^5R^6)_a$-," should be "-$(SiR^5R^6)_aO(SiR^5R^6)_a$-,"

Column 40, Line 60, Claim 21:
"-$(CR^5R^{R6})_aOC(O)$-," should be "--$(CR^5R^6)_aC(O)$-,"

Column 41, Claim 26:
" 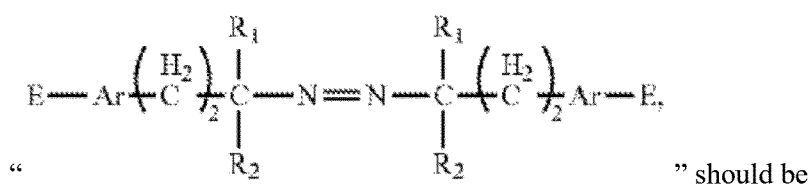 " should be

Signed and Sealed this
Thirtieth Day of January, 2024

Katherine Kelly Vidal
*Director of the United States Patent and Trademark Office*

CERTIFICATE OF CORRECTION (continued)
U.S. Pat. No. 10,829,570 B2

" 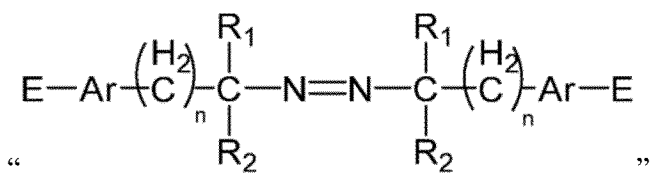 "